(12) United States Patent
Toma et al.

(10) Patent No.: US 12,342,033 B2
(45) Date of Patent: Jun. 24, 2025

(54) TRANSMISSION METHOD, RECEPTION METHOD, TRANSMISSION DEVICE, AND RECEPTION DEVICE

(71) Applicant: Sun Patent Trust, New York, NY (US)

(72) Inventors: Tadamasa Toma, Osaka (JP); Noritaka Iguchi, Osaka (JP); Takahiro Nishi, Nara (JP); Hisaya Katou, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 18/207,244

(22) Filed: Jun. 8, 2023

(65) Prior Publication Data

US 2023/0336810 A1     Oct. 19, 2023

Related U.S. Application Data

(63) Continuation of application No. 17/346,442, filed on Jun. 14, 2021, now Pat. No. 11,770,577, which is a
(Continued)

(30) Foreign Application Priority Data

Jul. 4, 2014  (JP) .................................. 2014-138920

(51) Int. Cl.
*H04N 21/23*      (2011.01)
*H04N 21/233*    (2011.01)
(Continued)

(52) U.S. Cl.
CPC ..... *H04N 21/43072* (2020.08); *H04N 21/233* (2013.01); *H04N 21/2368* (2013.01);
(Continued)

(58) Field of Classification Search
None
See application file for complete search history.

(56) References Cited

U.S. PATENT DOCUMENTS

| 5,808,722 | A | 9/1998 | Suzuki |
| 7,058,721 | B1 * | 6/2006 | Ellison ................... H04N 19/70 |
| | | | 375/E7.199 |
| 2001/0008547 | A1 | 7/2001 | Oh |

FOREIGN PATENT DOCUMENTS

| EP | 0 817 502 | 1/1998 |
| EP | 1 536 644 | 6/2005 |
| JP | 2006-352306 | 12/2006 |

OTHER PUBLICATIONS

International Search Report of PCT application No. PCT/JP2014/003799 dated Oct. 21, 2014.
(Continued)

*Primary Examiner* — Cai Y Chen
(74) *Attorney, Agent, or Firm* — Wenderoth, Lind & Ponack, L.L.P.

(57) ABSTRACT

A transmitting method according to one aspect of the present disclosure includes transmitting video control information for reproduction of video data having an individually reproducible unit, transmitting the video data, determining a transmission order of audio control information for reproduction of audio data in a reproduction interval corresponding to a reproduction interval of the video data in such a way that the audio control information is transmitted after the video control information, and transmitting the audio control information according to the determined transmission order, and transmitting the audio data. Thus, in the receiving apparatus, a delay time from reception of data to reproduction of video and audio is shortened.

2 Claims, 21 Drawing Sheets

Related U.S. Application Data continuation of application No. 16/597,989, filed on Oct. 10, 2019, now Pat. No. 11,064,243, which is a continuation of application No. 14/968,947, filed on Dec. 15, 2015, now Pat. No. 10,484,734, which is a continuation of application No. PCT/JP2014/003799, filed on Jul. 17, 2014.

(60) Provisional application No. 61/856,139, filed on Jul. 19, 2013.

(51) Int. Cl.
*H04N 21/2368* (2011.01)
*H04N 21/262* (2011.01)
*H04N 21/43* (2011.01)
*H04N 21/845* (2011.01)
*H04N 21/854* (2011.01)
*H04N 21/8547* (2011.01)

(52) U.S. Cl.
CPC ... *H04N 21/26258* (2013.01); *H04N 21/8456* (2013.01); *H04N 21/85406* (2013.01); *H04N 21/8547* (2013.01)

(56) References Cited

OTHER PUBLICATIONS

"Information technology—High efficiency coding and media delivery in heterogeneous environments—Part1:MPEG media transport(MMT)" ISO/IEC FDIS 23008-1, 2013.
The Extended European Search Report dated Jun. 23, 2016 for the related European Patent Application No. 14825951.8.
Office Action issued Feb. 7, 2025 in U.S. Appl. No. 18/233,925.

* cited by examiner

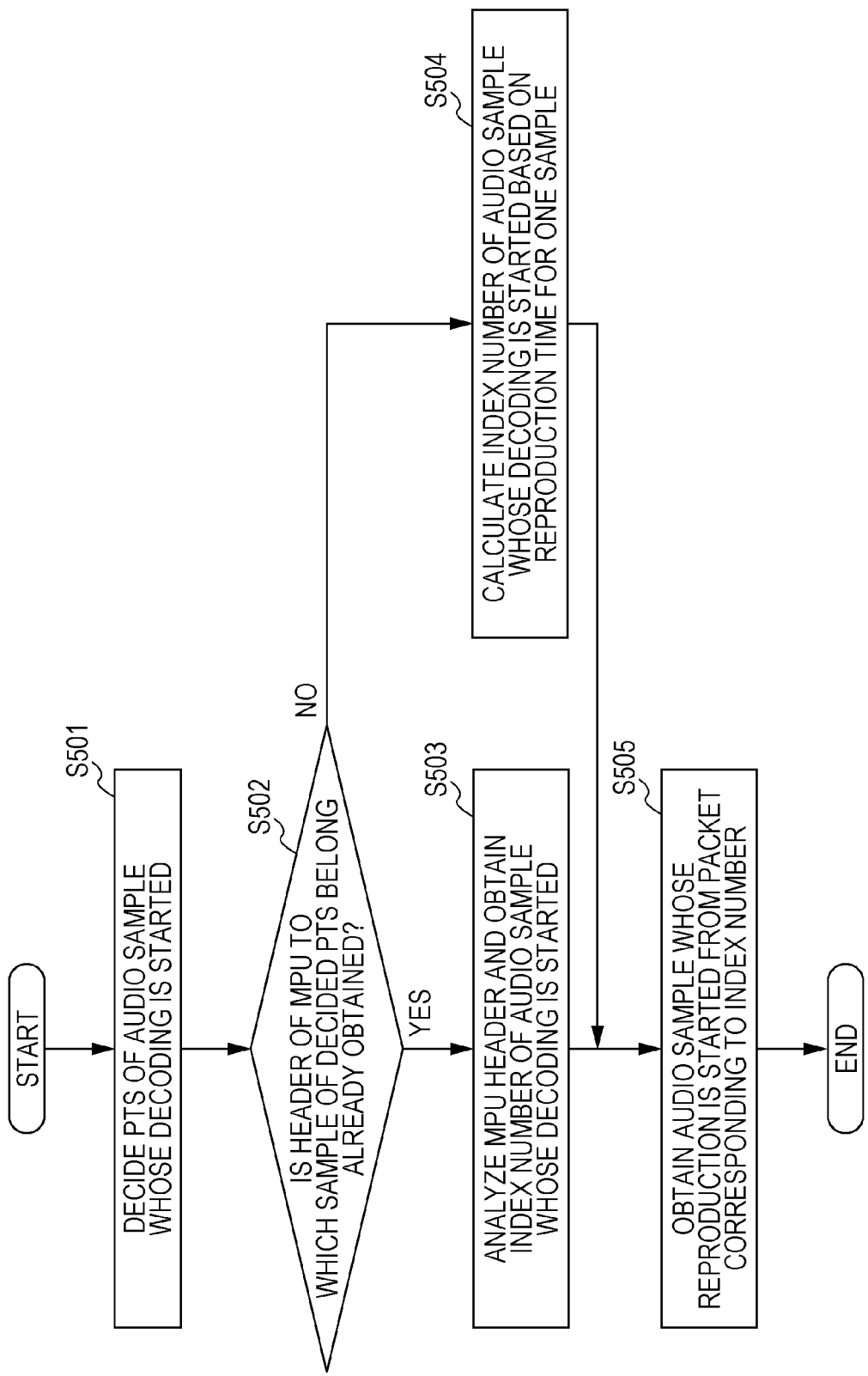

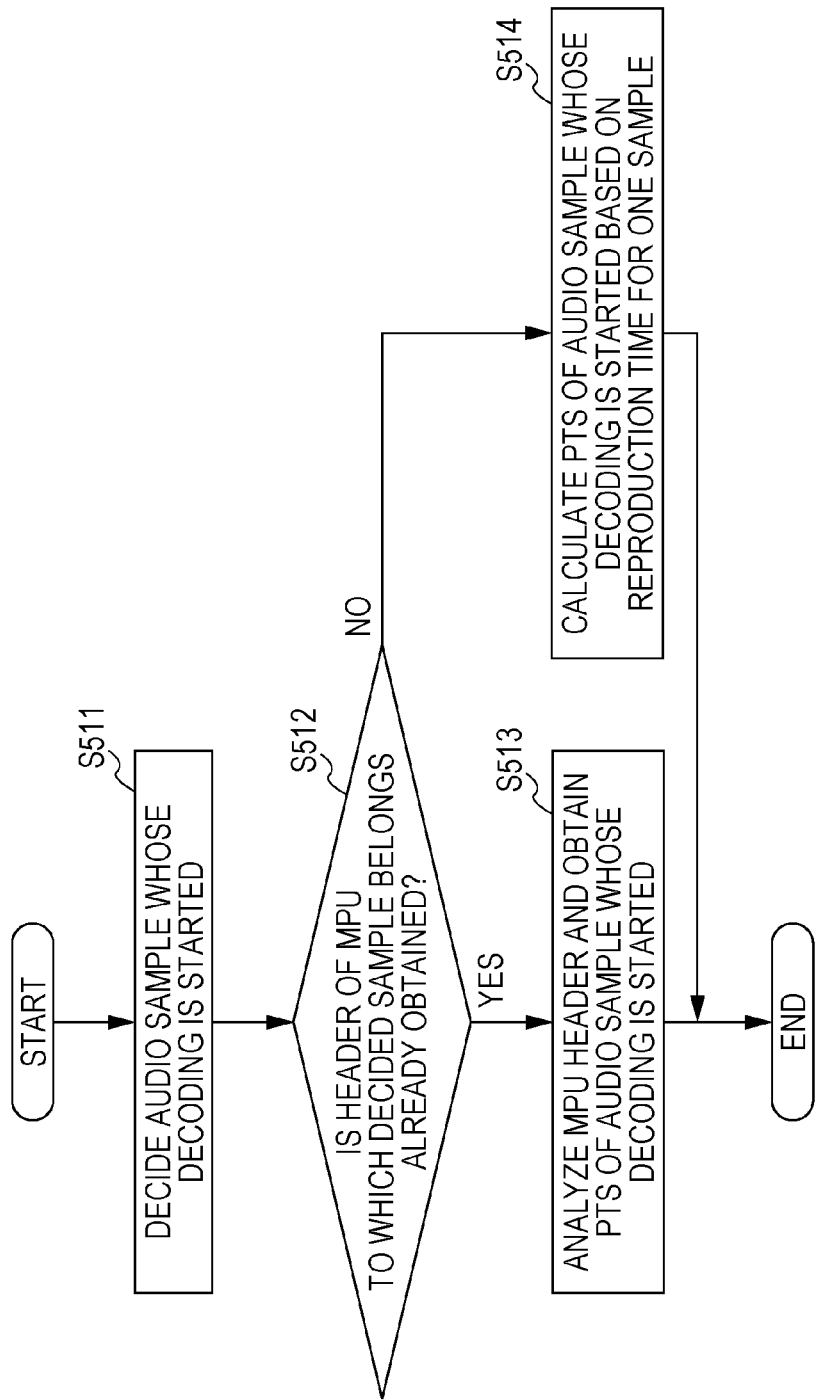

TRANSMISSION METHOD, RECEPTION METHOD, TRANSMISSION DEVICE, AND RECEPTION DEVICE

BACKGROUND

1. Technical Field

The present disclosure relates to a transmitting method, a receiving method, a transmitting apparatus, and a receiving apparatus.

2. Description of the Related Art

At the present, a consideration is conducted on that coded data of audio and video are segmented according to a format such as MPEG-DASH (Dynamic Adaptive Streaming over HTTP) or MMT (MPEG Media Transport), the obtained segment is divided so as to be packetized, and the obtained packet is transmitted by broadcasting or communication.

For example, Non-Patent Literature 1 discloses a technique for transmitting each packet of coded media data according to the MMT.

CITATION LIST

Non-Patent Literature

Non-Patent Literature 1: Information technology-High efficiency coding and media delivery in heterogeneous environments-Part1: MPEG media transport (MMT), ISO/IEC FDIS 23008-1

SUMMARY

In one general aspect, the techniques disclosed here feature a transmitting method including: transmitting video control information for reproduction of video data having an individually reproducible unit; transmitting the video data; determining a transmission order of audio control information for reproduction of audio data in a reproduction interval corresponding to a reproduction interval of the video data in such a way that the audio control information is transmitted after the video control information, and transmitting the audio control information according to the determined transmission order; and transmitting the audio data.

The present disclosure can provide a transmitting method or a receiving method that can reduce a delay time from reception of data to reproduction of video and audio in a receiving apparatus.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 20 is a flowchart illustrating a receiving process according to the fifth exemplary embodiment; and FIG. 21 is a flowchart illustrating another example of the receiving process according to the fifth exemplary embodiment.

DETAILED DESCRIPTION (Underlying Knowledge Forming Basis of the Present Disclosure)

Each of segments includes a header portion, and a storage portion of coded data. A receiving apparatus separates access units (designated as samples in a format on a basis of MP4 such as DASH and MMT) from the coded data. Further, the receiving apparatus needs analysis of the header portion in order to obtain PTS (Presentation Time Stamp) and DTS (Decoding Time Stamp) of the access units.

In conventional broadcasting, video and audio are packetized for each access unit, and are multiplexed into MPEG-2 TS (Transport Stream) so as to be transmitted. For this reason, the receiving apparatus can separate the access units and obtain PTS and DTS by packet.

On the other hand, when the segments are packetized to be transmitted like DASH and MMT, the receiving apparatus needs to obtain headers of the segments also at a time of a random access. Therefore, when the receiving apparatus starts to receive a signal from a middle of a segment, the receiving apparatus cannot decode an access unit of the segment. For this reason, the receiving apparatus can perform decoding on a next segment. Thus, the inventors of the present disclosure have found a problem that a delay time until start of decoding is lengthened in the random access. With reference to FIGS. 1 to 4, a description will be given below of the problem at the time of the random access in the conventional method for packetizing and multiplexing MPU (Media Processing Unit) forming MMT.

A description will be given first of a method for storing video and audio data in conventional MP4, and a data storage example in MMT as a transmission format on a basis of MP4.

Figure 1:
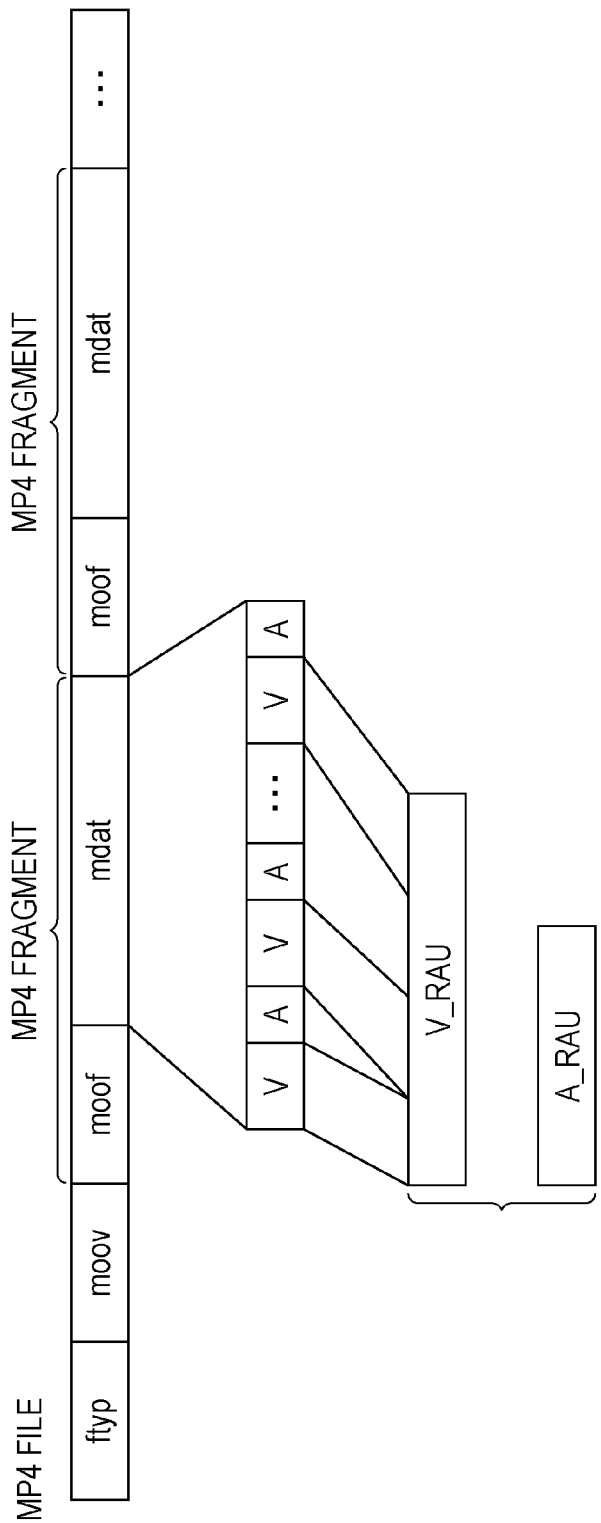
FIG. 1 is a diagram illustrating a configuration example of an MP4 file.

FIG. 1 is a diagram illustrating the data storage example in MP4. As shown in FIG. 1, an MP4 file includes a plurality of MP4 fragments. Each of the MP4 fragments includes a pair of moof and mdat. The mdat includes a plurality of video samples and a plurality of audio samples that are disposed alternatively.

In general, the MP4 fragments are used as random access points, and samples forming a video random access unit (RAU) are stored in the MP4 fragments. The audio can be decoded from any sample, and a sample corresponding to a reproduction interval of the video in the random access unit is stored.

For example, when the reproduction interval of the video in random access unit is 1 second between 10 sec and 11 sec, a sample for 1 second between 10 sec and 11 sec is stored as a corresponding audio sample.

The reproduction intervals of the video and audio do not definitely match with each other at some video frame rates and some audio sampling frequencies. In this case, for example, an audio sample having PTS just before PTS of a head sample in the video reproduction interval through an audio sample having a reproduction end time just before a reproduction end time of a final sample in the video reproduction interval are selected.

Figure 2:
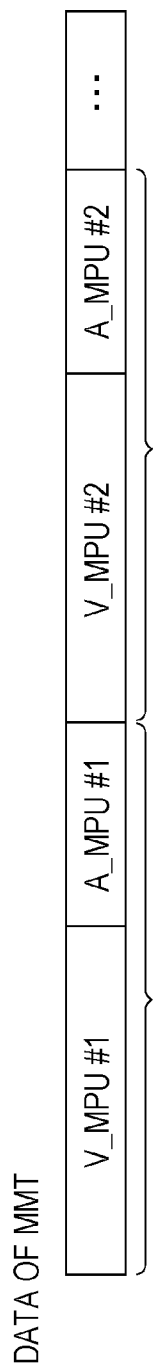
FIG. 2 is a diagram illustrating a configuration example of MMT data.

FIG. 2 is a diagram illustrating a storage example of data to be stored into MPU in MMT. Similarly to the case of FIG. 1, MPU is generated so that the reproduction intervals of the MPUs are equal to each other between the video and the audio.

Analysis of an MPU header (moof or the like) to which the sample belongs is necessary for decoding video and audio samples.

Figure 3:
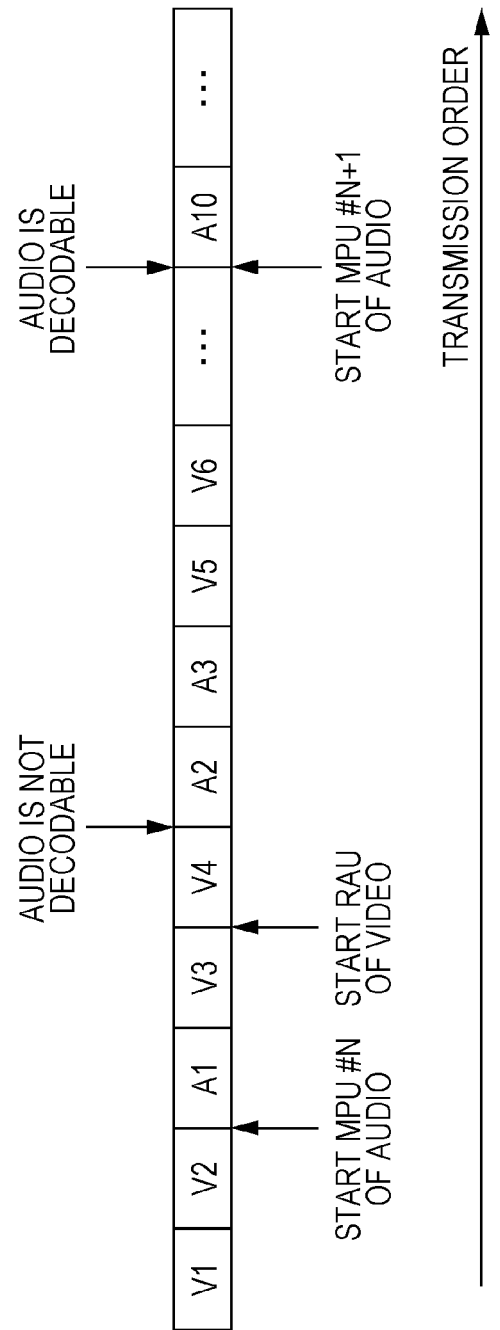
FIG. 3 is a diagram illustrating an audio sample whose decoding can be started in the MMT data.

FIG. 3 is a diagram illustrating a problem in the random access when MMT data shown in FIG. 2 is packetized and multiplexed into an MMT packet to be transmitted. FIG. 3 illustrates an arrangement of video data and audio data to be stored in each MMT packet and are transmitted (transmission order). As to the videos, RAU starts from a video sample V4. That is to say, the video can be decoded starting from the video sample V4.

Further, MPU #N representing an Nth audio starts from an audio sample A1, and MPU #N+1 starts from an audio sample A10. Further, the audio sample having PTS just after PTS of the video sample V4 is an audio sample A2.

In such a case, when the receiving apparatus starts reception from the video sample V4, the receiving apparatus cannot obtain a header of MPU #N of the audio, and thus audio samples A2 and A3 included in MPU #N cannot be decoded. Therefore, the receiving apparatus can start decoding from the audio sample A10 that is a head sample of MPU #N+1.

Figure 4:
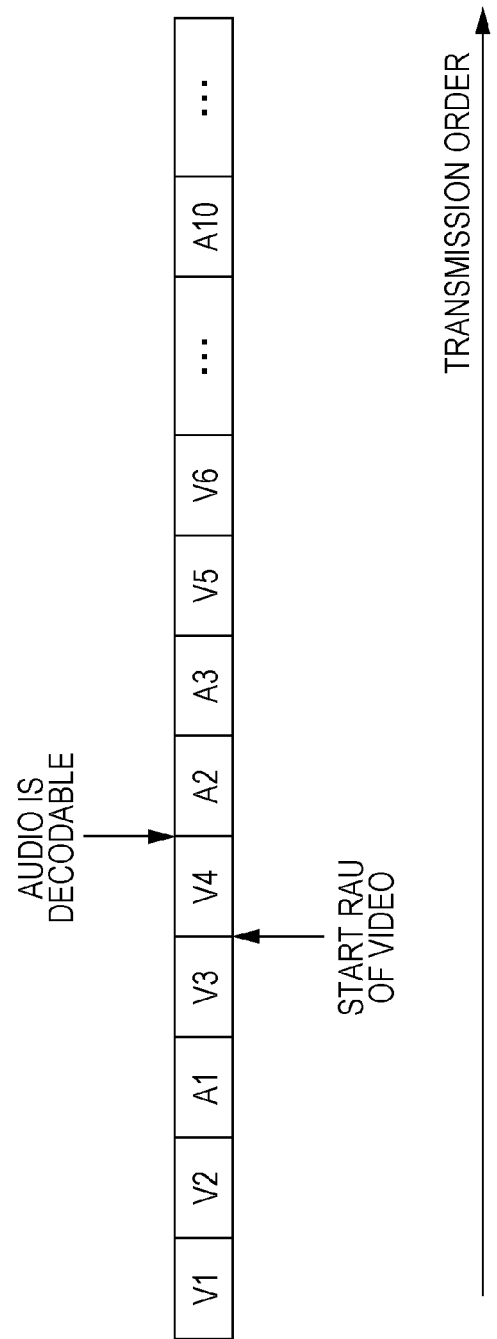
FIG. 4 is a diagram illustrating an audio sample whose decoding can be started in MPEG-2 TS.

On the other hand, in conventional TS using MPEG-2 TS (Transport Stream) as a transmission format, the receiving apparatus can start decoding from an access unit of an audio starting just after a random access point of video. For example, as shown in FIG. 4, when data is received on the same sequence as that in FIG. 3, the receiving apparatus can decode the audio starting from the audio sample A2.

Thus, when an MMT stream obtained by multiplexing video and audio is transmitted through broadcasting or communication, disadvantageously, a delay time during which the receiving apparatus starts decoding from a random access point of video and then can start reproduction of audio is occasionally lengthened.

The video is limited such that the reproduction can be started only by unit of a RAU. For this reason, it is almost inevitable that a certain delay time is present in video data until the video is displayed. On the other hand, although the audio can be reproduced from any sample, the delay time is generated until the reproduction starts in the above case. The inventors of the present disclosure have found a problem that although the receiving apparatus receives reproducible data, the data cannot be reproduced because the receiving apparatus cannot receive control information of the data.

A transmitting method according to one aspect of the present disclosure includes: transmitting video control information for reproduction of video data in individually reproducible unit; transmitting the video data; determining a transmission order of audio control information for reproduction of audio data in a reproduction interval corresponding to a reproduction interval of the video data in such a way that the audio control information is transmitted after the video control information, and transmitting the audio control information according to the determined transmission order; and transmitting the audio data.

Accordingly, in the transmitting method, the audio control information of the audio data is transmitted after the video control information of the video data corresponding to the audio data. As a result, the receiving apparatus can start to decode also the audio at a time when decoding of the video can be started at the time of the random access. Therefore, the delay time until the receiving apparatus starts to decode the audio data can be shortened. Further, since the segment of the audio does not have to be subdivided, overhead can be also reduced.

For example, the audio data includes a plurality of audio samples that can be reproduced individually, and the audio control information includes time information representing a reproduction start time of each of the plurality of audio samples.

For example, the reproduction interval of the audio data is approximately equal to the reproduction interval of the video data.

In the step of transmitting the audio data, for example, the audio data is divided into a plurality of packets each of which includes one of the plurality of audio samples so as to be transmitted, and each of the plurality of packets includes order information representing a packet number among the plurality of packets.

As a result, even when the receiving apparatus cannot receive the audio control information, the receiving apparatus can calculate the reproduction start times of the respective audio samples and reproduce the audio samples using the calculated reproduction start times. Therefore, the delay time until the receiving apparatus starts to decode the audio data can be shortened.

For example, the video data is one of the plurality of video data obtained by dividing a video signal, the audio data is one of the plurality of audio data obtained by dividing an audio signal, and the reproduction time of the audio data is shorter than the reproduction time of the video data.

As a result, the delay time until the receiving apparatus starts to decode the audio data is shortened.

For example, the plurality of audio data includes a plurality of audio data at the reproduction start times approximately equal to the reproduction start times of the plurality of video data.

Further, in the receiving method according to one aspect of the present disclosure, the video control information, the video data, the audio control information, and the audio data transmitted through the transmitting method are received.

Accordingly, the receiving apparatus can start to decode also the audio at a time when the receiving apparatus can start to decode the video at the time of the random access. Therefore, the delay time until the receiving apparatus starts to decode the audio data can be shortened.

For example, the receiving method for receiving the video control information, the video data, the audio control information, and the audio data transmitted according to the transmitting method includes obtaining a head reproduction start time as a reproduction start time of an audio sample to be first reproduced in the plurality of audio samples, obtaining respective reproduction times of the plurality of audio samples, and determining the reproduction start time of the audio sample included in the packet to be processed, by using the head reproduction start time, the reproduction times, and order information included in the packet to be processed.

As a result, even when the receiving apparatus cannot receive the audio control information, the receiving apparatus can calculate the reproduction start times of the respective audio samples and reproduce the audio samples using the calculated reproduction start times. Therefore, the delay time until the receiving apparatus starts to decode the audio data can be shortened.

Further, a transmitting apparatus according to one aspect of the present disclosure includes a video control information transmitter that transmits video control information for reproducing video data in individually reproducible unit, a video data transmitter that transmits the video data, an audio control information transmitter that determines a transmission order of audio control information for reproducing audio data in a reproduction interval corresponding to a reproduction interval of the video data in such a way that the audio control information is transmitted after the video control information, and transmits the audio control information according to the d transmission order, and an audio data transmitter that transmits the audio data.

As a result, the transmitting apparatus transmits the audio control information of the audio data after the video control information of the video data corresponding to the audio data. As a result, the receiving apparatus can start to decode also the audio at a time when decoding of the video can be started at the time of the random access. Therefore, the delay time until the receiving apparatus starts to decode the audio data can be shortened. Further, since the segment of the audio does not have to be subdivided, overhead can be also reduced.

Further, the receiving apparatus according to one aspect of the present disclosure receives the video control information, the video data, the audio control information, and the audio data transmitted by the transmitting apparatus.

As a result, the receiving apparatus can start to decode also the audio at a time when the receiving apparatus can start to decode the video at the time of random access. Therefore, the delay time until the receiving apparatus starts to decode the audio data can be shortened.

Note that these general or specific aspects may be implemented using a system, a method, an integrated circuit, a computer program, or a computer-readable recording medium such as a CD-ROM, or using any given combination of a system, a method, an integrated circuit, a computer program, and a computer-readable recording medium. The exemplary embodiments are specifically described below with reference to the drawings.

The exemplary embodiments described below are specific examples of the present disclosure. Numerical values, shapes, materials, components, disposing positions and connecting forms of the components, steps, and order of the steps described in the following exemplary embodiments are examples, and thus are not intended to limit the present disclosure. Further, components that are not described in independent claims representing the top concepts in the components in the following exemplary embodiments are described as optional components.

First Exemplary Embodiment

A transmitting method and a transmitting apparatus according to this exemplary embodiment are described below. In the transmitting method according to this exemplary embodiment, an MMT packet that stores an MPU header of MPU of audio having the same reproduction interval as that of MPU of video is transmitted after an MMT packet that stores an MPU header of MPU of the video.

As a result, the receiving apparatus can start to decode also the audio at a time when the receiving apparatus can start to decode the video at a time of a random access. Therefore, a delay time until the receiving apparatus starts to decode the audio can be shortened. Further, since a segment of the audio is not subdivided, overhead can be also reduced.

A data structure in the transmitting method according to this exemplary embodiment is described first.

Figure 5:
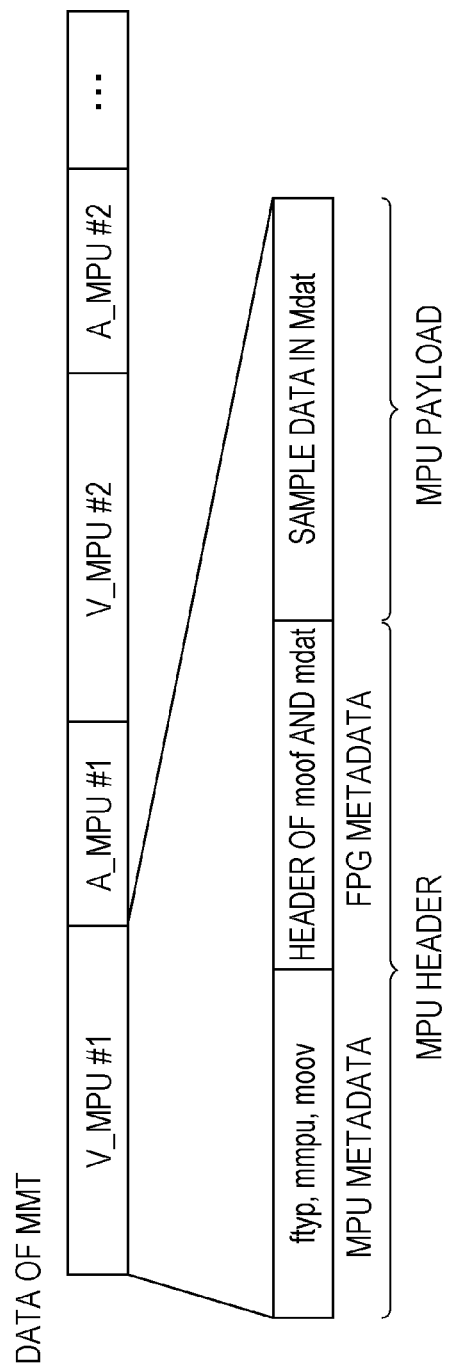
FIG. 5 is a diagram illustrating a configuration example of transmission data according to the first exemplary embodiment.

FIG. 5 is a diagram illustrating an MPU structure according to this exemplary embodiment. As shown in FIG. 5, the MMT data includes a plurality of video MPUs (V_MPU), and a plurality of audio MPUs (A_MPU).

Each MPU (each video MPU and each audio MPU) includes an MPU header and an MPU payload. The MPU header includes MPU metadata (ftyp, mmpu, moov and the like), and an FRG metadata (a header of movie fragment unit such as moof and mdat). Further, the MPU header includes information representing at least one of PTS and DTS of each of a plurality of samples included in the MPU metadata.

Hereinafter, the MPU header of the video MPU is designated as a video MPU header, and the MPU payload of the video MPU is designated as a video MPU payload. Further, the MPU header of the audio MPU is designated as an audio MPU header, and the MPU payload of the audio MPU is designated as an audio MPU payload.

For example, each of the plurality of the audio MPUs corresponds to one of the plurality of video MPUs. In FIG. 5, the corresponding video MPU and audio MPU are denoted by V_MPU #n (n: natural number) and A_MPU #n. Further, the corresponding audio MPU and video MPU have the same reproduction interval, for example.

The reproduction intervals of the video and audio do not definitely match with each other at some video frame rates or some audio sampling frequencies. At this time, for example, an audio sample having PTS just before PTS of a head sample in the reproduction interval of the video MPU through an audio sample having a reproduction end time just before a reproduction end time of a final sample in the reproduction interval of the video MPU are selected as the audio MPUs corresponding to the video MPUs. A sample having PTS just after PTS of a head sample in the reproduction interval of the video MPU through a sample having a reproduction end time just after a reproduction end time of a final sample in the reproduction interval of the video MPU may be selected as the audio MPUs corresponding to video MPUs.

That is to say, the corresponding video MPU and audio MPU have approximately the same reproduction interval. In other words, the reproduction intervals of the corresponding video MPU and audio MPU are at least partially overlapped with each other.

Figure 6:
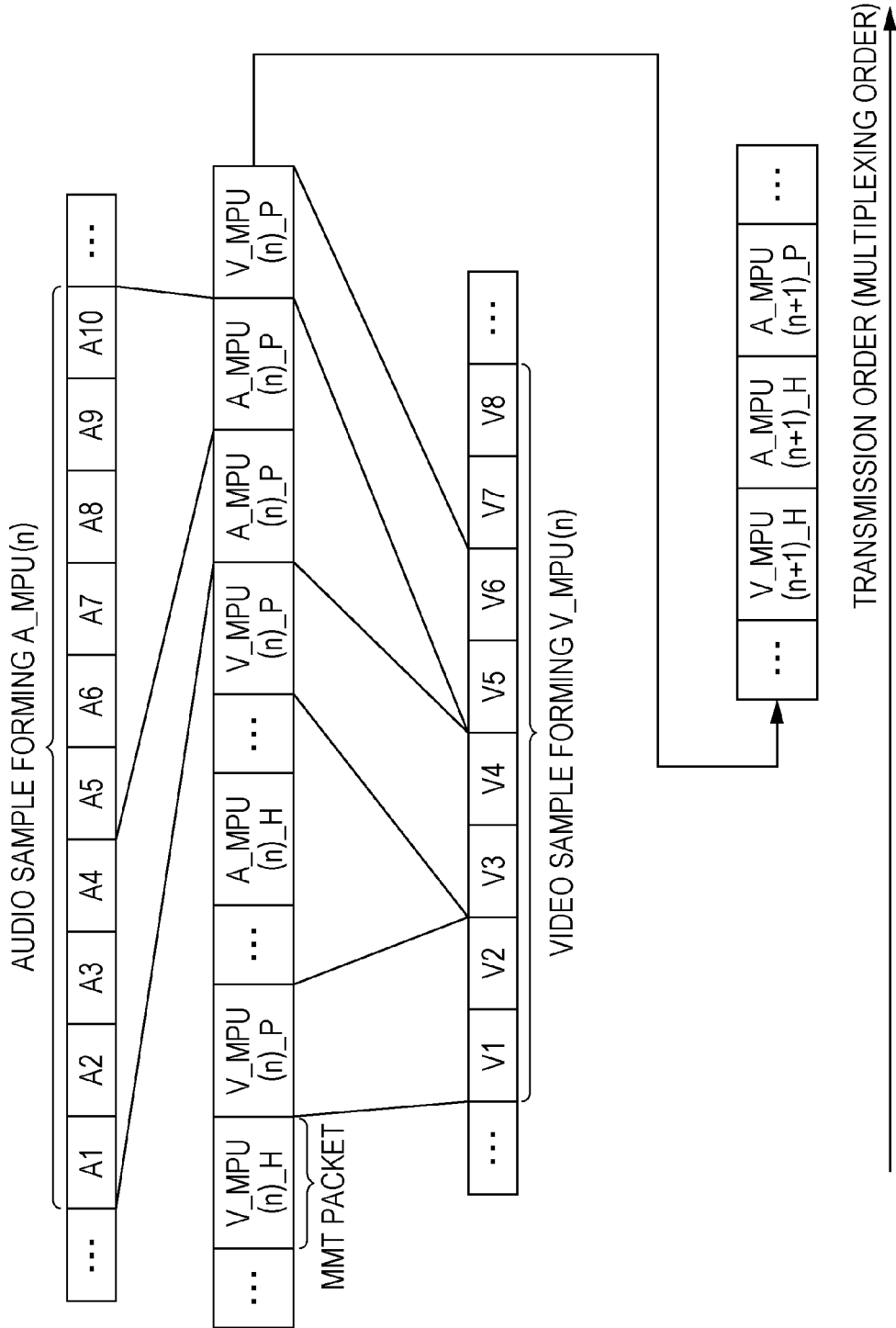
FIG. 6 is a diagram illustrating a transmission order of data according to the first exemplary embodiment.

FIG. 6 is a diagram illustrating one example of a transmission order (a multiplexing order) of an MMT packet in this exemplary embodiment.

The video MPU payload includes a plurality of video samples (access units) V1 to V8. The video MPU is divided into a plurality of MMT packets (hereinafter, designated also as video MMT packets). Each of the plurality of video MMT packets includes a packet (V_MPU (n)_H) for storing the video MPU header, and a plurality of packets (V_MPU (n)_P) for storing a plurality of video samples included in the video MPU payload. The plurality of video samples (V1 to V8) is divided to be stored in the plurality of packets (V_MPU (n)_P).

The audio MPU payload includes a plurality of audio samples (access units) A1 to A10. The audio MPU is divided into the plurality of MMT packets (hereinafter, designated also as audio MMT packets). Each of the plurality of audio MMT packets includes a packet (A_MPU (n)_H) for storing the audio MPU header, and a plurality of packets (A_MPU (n)_P) in which the plurality of audio samples included in the audio MPU payload is stored. The plurality of audio samples (A1 to A10) is divided to be stored in the plurality of packets (A_MPU (n)_P).

In this exemplary embodiment, as shown in FIG. 6, the MMT packet V_MPU (n)_H for storing the MPU header of the audio MPU corresponding to the video MPU is transmitted after the MMT packet A_MPU (n)_H for storing the MPU header of the video MPU.

As a result, the receiving apparatus can start to decode also the audio at a time when decoding of the video can be started at the time of the random access. Therefore, a delay time until the receiving apparatus starts to decode the audio can be shortened. Further, since a segment of the audio is not subdivided, overhead can be also reduced.

In encoding of the video, a coding amount of an access unit (a sample in MP4) at a head of RAU is generally larger than a coding amount of a subsequent access unit. On the other hand, as to the audio, a variation in the coding amount of the access unit is smaller than that of the video. For this reason, particularly when a packet sequence obtained by multiplexing coded data of the audio and the video is transmitted at a fixed rate, transmission of the head access unit of RAU of the video is started at an earlier time in order to ensure that all data of the access unit are received until the decoding time. Therefore, in MMT, even when a system decoder model such as STD (System Target Decoder) is defined similarly to MPEG-2 TS (Transport Stream), the MMT packet in which an nth audio MPU header is stored is transmitted after an MMT packet in which an nth video MPU header is stored, and the system decoder model can be satisfied.

A configuration and an operation of the transmitting apparatus according to this exemplary embodiment are described below.

Figure 7:
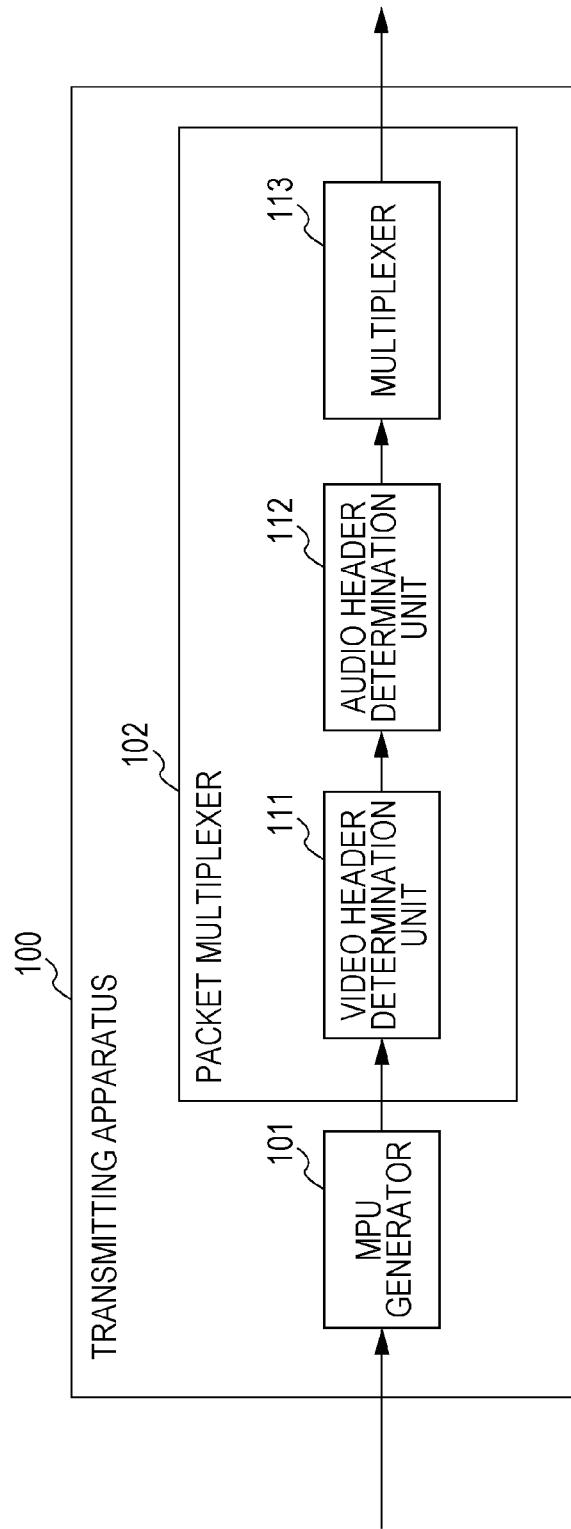
FIG. 7 is a block diagram illustrating a transmitting apparatus according to the first exemplary embodiment.

FIG. 7 is a block diagram illustrating transmitting apparatus 100 according to this exemplary embodiment. Transmitting apparatus 100 shown in FIG. 7 includes MPU generator 101 and packet multiplexer 102. Packet multiplexer 102 has video header determination unit 111, audio header determination unit 112, and multiplexer 113.

Figure 8:
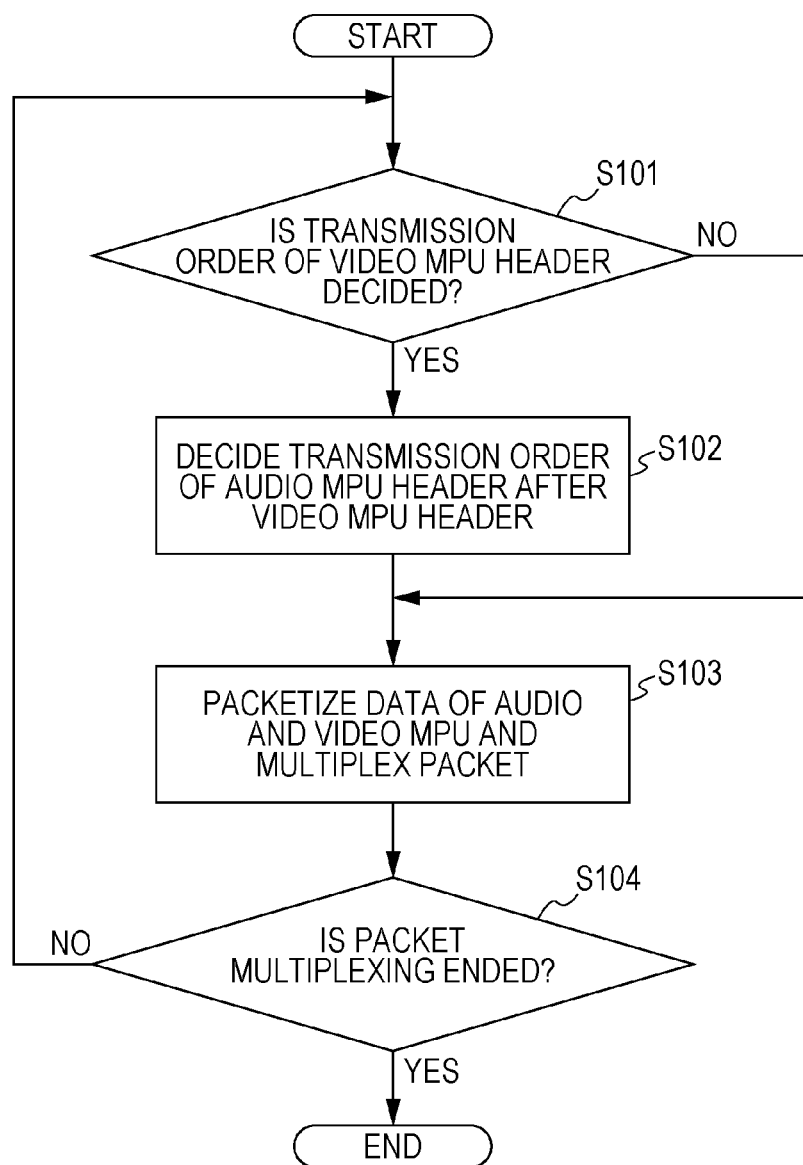
FIG. 8 is a flowchart illustrating a transmitting process according to the first exemplary embodiment.

FIG. 8 is a flowchart illustrating a transmitting process (multiplexing process) according to this exemplary embodiment.

MPU generator 101 divides input video signal and audio signal so as to generate a plurality of video MPUs and a plurality of audio MPUs.

Packet multiplexer 102 multiplexes the video MPUs and the audio MPUs.

Specifically, video header determination unit 111 determines whether a transmission order (VH_LOC) of the MMT packet for storing the MPU header of V_MPU (n) as an nth video MPU is determined (S101).

When VH_LOC is determined (Yes in S101), audio header determination unit 112 determines the transmission order so that the MMT packet for storing the MPU header of A_MPU (n) as an nth audio MPU is transmitted after VH_LOC (S102).

Multiplexer 113 stores data of the audio MPU and the video MPU in the MMT packet and multiplexes the packet so as to generate a transmission stream (S103). At this time, multiplexer 113 transmits the MMT packet in which the audio MPU header is to be stored according to the transmission order determined in step S102. That is to say, multiplexer 113 transmits the MMT packet for storing the MPU header of A_MPU (n) as the nth audio MPU after the MMT packet for storing the MPU header of V_MPU (n) as the nth video MPU.

On the other hand, when VH_LOC is not determined (No in S101), multiplexer 113 stores the data of the audio MPU and video MPU in the MMT packet, and multiplexes the packet so as to generate a transmission stream (S103).

Further, a series of the process is repeated until all the MMT packets are transmitted (S104).

Transmitting apparatus 100 determines the transmission order of the MMT packets of the audio MPU headers based on the MMT packets of the video MPU headers in such a way that the MMT packets of the audio MPU headers are transmitted after the MMT packets of the video MPU headers. However, transmitting apparatus 100 may determine the transmission order of the MMT packets of the video MPU headers based on the MMT packets of the audio MPU headers in such a way that the MMT packets of the video MPU headers are transmitted before the MMT packets of the audio MPU headers. In other words, multiplexer 113 may transmit the MMT packet for storing the MPU header of V_MPU (n) as the nth video MPU before the MMT packet for storing the MPU header of A_MPU (n) as the nth audio MPU.

In the above description, transmitting apparatus 100 multiplexes the MPU header and the MPU payload included in each MPU into a single stream so as to transmit the stream, but transmitting apparatus 100 may transmit the MPU header (or a portion of information included in the MPU header) as a separate signal different from the stream obtained by multiplexing the MPU payload. Also in this case, transmitting apparatus 100 transmits the audio MPU header after the video MPU header corresponding to the audio MPU header in this separate signal.

Further, also when transmitting apparatus 100 does not transmit the MPU header but transmits only the MPU payload, the reproduction intervals of the audio MPU and the video MPU may match with each other. In such a manner, index numbers of the video MPU and the audio MPU that are synchronously reproduced are identical to each other. In the transmission of MMT, absolute values of PTS and DTS in each MPU are provided to the receiving apparatus. Therefore, since the index numbers of the video MPU and the audio MPU that are synchronously reproduced are identical to each other, a processing amount of searching for an access unit of audio having PTS corresponding to PTS of the access unit of video whose reproduction is started in the receiving apparatus can be reduced.

Figure 9:
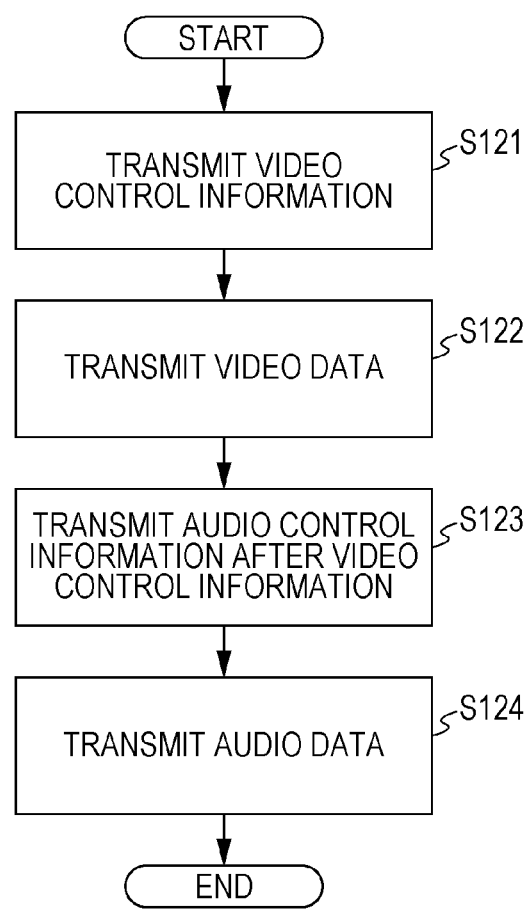
FIG. 9 is a flowchart illustrating a transmitting process according to the first exemplary embodiment.

Transmitting apparatus 100 according to this exemplary embodiment executes a process shown in FIG. 9.

Transmitting apparatus 100 transmits video control information (a video MPU header) for reproducing video data (a video MPU) in an individually reproducible unit (an RAU unit) (S121).

Transmitting apparatus 100, then, transmits the video data (the video MPU) in the individually reproducible unit (RAU unit) (S122).

Transmitting apparatus 100 transmits audio control information (an audio MPU header) for reproducing audio data (an audio MPU) in a reproduction interval corresponding to a reproduction interval of the video data after transmitting the video control information (S123). That is to say, transmitting apparatus 100 determines a transmission order of the audio control information (the audio MPU header) for reproducing the audio data (the audio MPU) in the reproduction interval corresponding to the reproduction interval of the video data in such a way that the audio control information is transmitted after the video control information, and transmits the audio control information according to the determined transmission order. In other words, transmitting apparatus 100 determines the transmission order of the audio control information so that the audio control information is not earlier in transmission order than the video control information, and transmits the audio control information according to the determined transmission order. As a result, the audio control information is always transmitted after the video control information. In other words, transmitting apparatus 100 inhibits the audio control information from being transmitted before the video control information.

Transmitting apparatus 100, then, transmits the audio data (S124).

For example, the audio data includes a plurality of audio samples that is individually reproducible. Further, the audio control information includes time information (PTS) representing reproduction start times of the plurality of audio samples. Further, the reproduction interval of the audio data is approximately equal to the reproduction interval of the video data.

When segments are packetized and multiplexed so as to be transmitted, transmitting apparatus 100 according to this exemplary embodiment transmits a header of an audio segment (MPU) after a header of a video segment whose head PTS matches with that of the audio segment. As a result, the receiving apparatus can start to decode also the audio at a time when the decoding of the video can be started at the time of the random access. Therefore, the delay time from the start of decoding the video to the start of decoding the audio can be shortened. Further, since the audio segment does not have to be subdivided, the overhead can be also reduced.

Second Exemplary Embodiment

In this exemplary embodiment, a transmitting apparatus generates a stream such that a receiving apparatus can determine PTS of an audio sample based on information included in audio sample data. As a result, the receiving apparatus can reproduce an audio sample even when the receiving apparatus cannot obtain an audio MPU header.

For example, the use of the method of this exemplary embodiment enables the receiving apparatus to start decoding from the audio sample A2 also in the case shown in FIG. 3.

Figure 10:
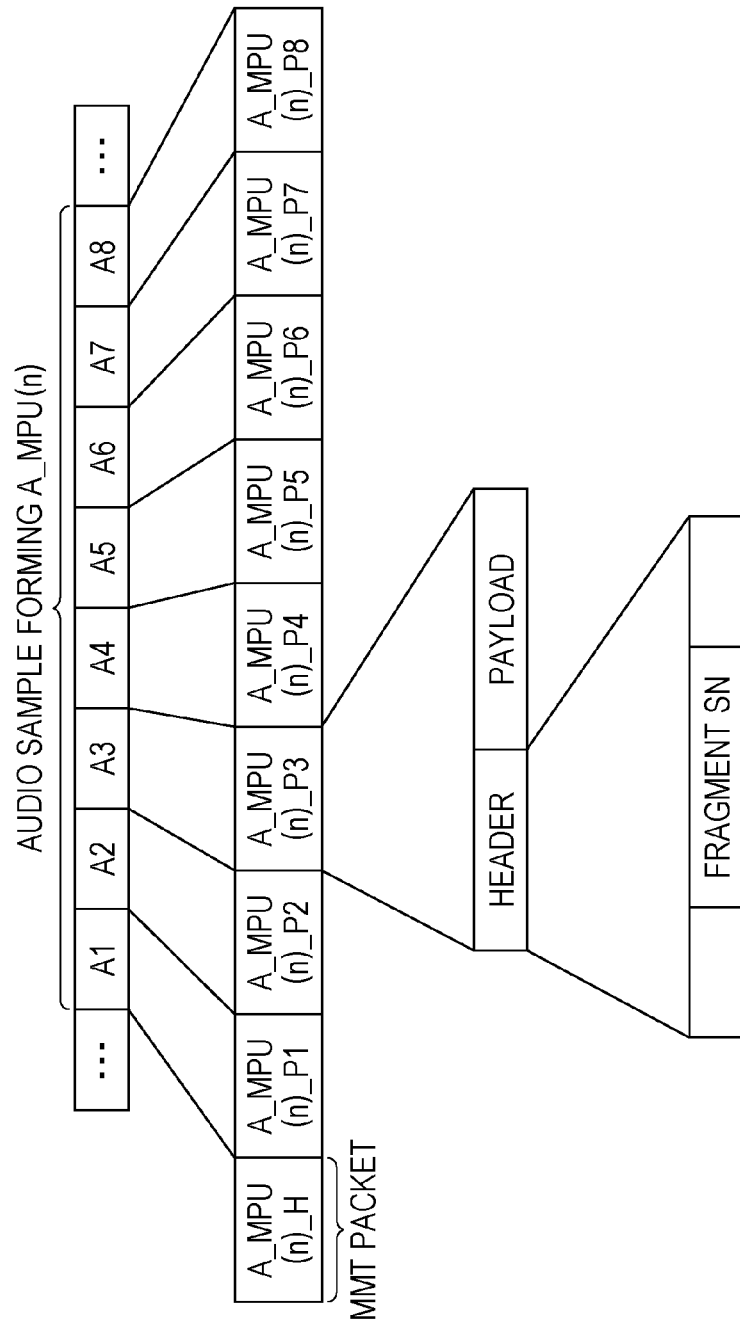
FIG. 10 is a diagram illustrating a configuration example of transmission data according to a second exemplary embodiment.

FIG. 10 is a diagram illustrating a structure of audio MPU according to this exemplary embodiment.

As shown in FIG. 10, one audio sample (any one of A1 to A8) is stored in each of a plurality of MMT packets (A_MPU (n)_P1 to AMPU (n)_P8) for storing audio samples. That is to say, the plurality of MMT packets is in one-to-one correspondence with a plurality of audio samples.

Further, each of the MMT packets includes a header and a payload for storing data of an audio sample. The header includes a fragment SN. The fragment SN is an index number of a unit (a fragment) obtained by dividing MPU. That is to say, the fragment SN represents a packet number of a fragment (a packet) is in MPU. Further, in this exemplary embodiment, since one audio sample is stored in one fragment (one packet), this fragment SN represents a decoding order of the audio sample included in this fragment in MPU.

The MMT packet that stores the audio sample does not include an MPU header.

Further, PTS (Presentation Time Stamp) of the head sample in the audio MPU whose decoding is started is separately transmitted to the receiving apparatus through an MMT message or the like.

For example, when decoding starts after tuning of broadcasting, PTS of a head sample of MPU to be transmitted for a constant period after the tuning is shown in a PA message or the like of MMT to be obtained at the time of the tuning.

Further, the sample data includes information representing a sampling frequency. For example, in an ADTS (Audio Data Transport Stream) system of AAC of MPEG-2 and MPEG-4, an ADTS header includes information representing a sampling frequency and a channel structure.

Further, when ADTS and LATM (Low-overhead MPEG-4 Audio Transport Multiplex) of AAC are stored in MP4, header information such as the ADTS header is deleted from the sample data, and the header information is stored in stsd of moov in some cases. In this case, information representing whether sample data of AAC includes the header information may be stored in a brand of an MP4 file or Box that is separately defined, or whether the sample data of AAC includes the header information may be set in an operation regulation of broadcasting in advance. In another manner, the information representing whether the sample data includes the header information may be included in SI information of MMT or the like. Further, when the multiplexing system is MMT, ADTS or LATM may be specified as a stream type to indicate that the header information is included in the sample data. When the sample data includes the header information, the receiving apparatus can decode and reproduce the audio based on the header information even when the MPU header is not transmitted or cannot be obtained.

When the sample data does not include the header information, the receiving apparatus needs to obtain a reproduction time of the sample in advance. When the sample data does not include the header information, the receiving apparatus may start decoding from MPU from which the MPU header can be obtained without using the following method.

The receiving apparatus calculates PTS of an audio sample using PTS of a head sample in MPU, the reproduction time of one audio sample, and the fragment SN. Specifically, the receiving apparatus determines PTS of any audio sample using the following (Expression 1).

$$\text{sample}(i).pts = MPU(n).pts + (num\_spl/\text{sampling\_rate}) * frg\_sn \quad \text{(Expression 1)}$$

where sample (i).pts represents PTS of an ith sample in nth MPU, and MPU (n).pts represents PTS of a head sample in display order in the nth MPU.

In Expression 1 above, num_spl represents a number of samples included in an audio frame. The sample in this case is different from a sample in MP4. In a case of AAC (Advanced Audio Coding) of MPEG-2 or MPEG-4, the number of samples is 1024 in one frame.

In Expression 1 above, sampling_rate represents a sampling frequency of the audio, and frg_sn represents the fragment SN.

That is to say, the receiving apparatus divides the number of the samples included in the audio frame by the sampling frequency so as to calculate the reproduction time of one audio sample. The receiving apparatus adds a product of the reproduction time of one audio sample and the fragment SN (the index number of the sample in MPU) to PTS of the head sample in MPU so as to calculate PTS of the audio sample.

When the reproduction time of one audio sample can be obtained by using a method other than the above method, the receiving apparatus may use another method.

For example, when the reproduction time of a sample is constant such that the sampling frequency of the audio is constant, the receiving apparatus may determine PTS of the audio sample based on the reproduction time obtained in advance.

Further, the information representing the sampling frequency or the reproduction time of the sample may be transmitted through the MMT message. When the MMT packet is directly stored or multiplexed into an IP packet so as to be stored in a TS packet and is transmitted, the information representing the sampling frequency or the reproduction time of the sample may be transmitted by a descriptor of the MPEG-2 system.

Further, when a frame rate is already known or can be separately obtained through the MMT message or the like, this method can be applied also to a case of video.

In MPEG-4 AVC (Advanced Video Coding) and MPEG HEVC (High Efficiency Video Coding), the sample data needs to include initialization information, such as SPS (Sequence Parameter Set) and PPS (Picture Parameter Set), at the time of decoding. Whether the sample includes SPS and PPS can be discriminated by a brand name of MP4 or a type of sample entry, and therefore these pieces of information may be additionally transmitted.

Thus, even when the receiving apparatus cannot receive an audio MPU header, the receiving apparatus can obtain PTS of any audio sample in MPU. As a result, a delay time until the reproduction of audio can be shortened without providing limitation to the transmission order of the video MPU header and the audio MPU header.

A configuration and an operation of the transmitting apparatus according to this exemplary embodiment are described below.

Figure 11:
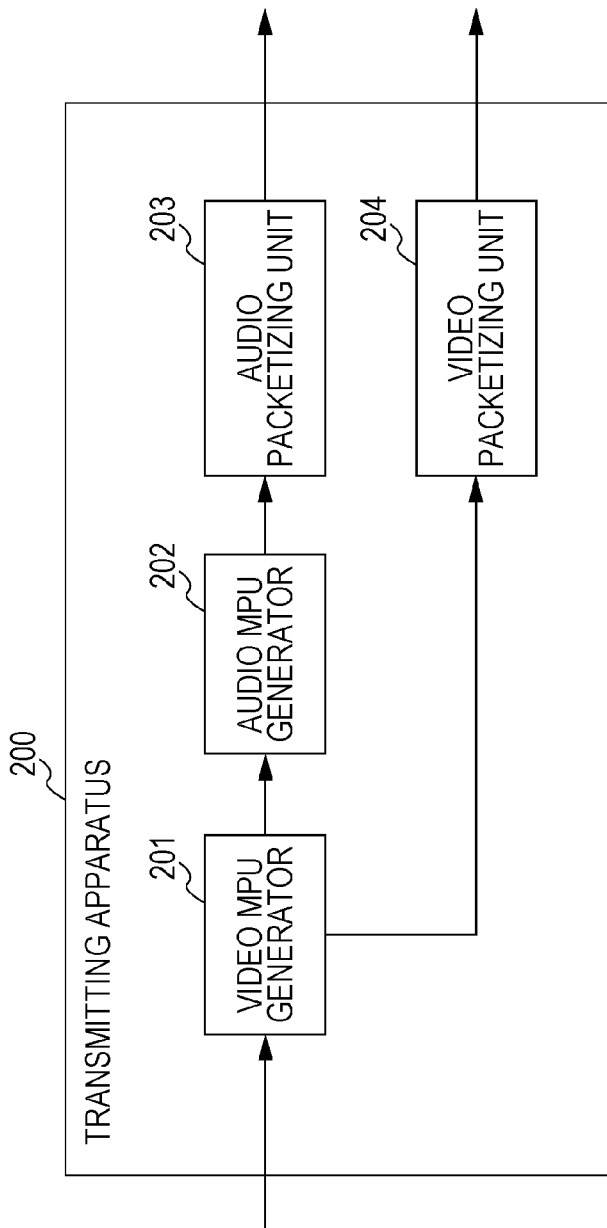
FIG. 11 is a block diagram illustrating a transmitting apparatus according to the second exemplary embodiment.

FIG. 11 is a block diagram illustrating transmitting apparatus 200 according to this exemplary embodiment. Transmitting apparatus 200 shown in FIG. 11 includes video MPU generator 201, audio MPU generator 202, audio packetizing unit 203, and video packetizing unit 204.

Figure 12:
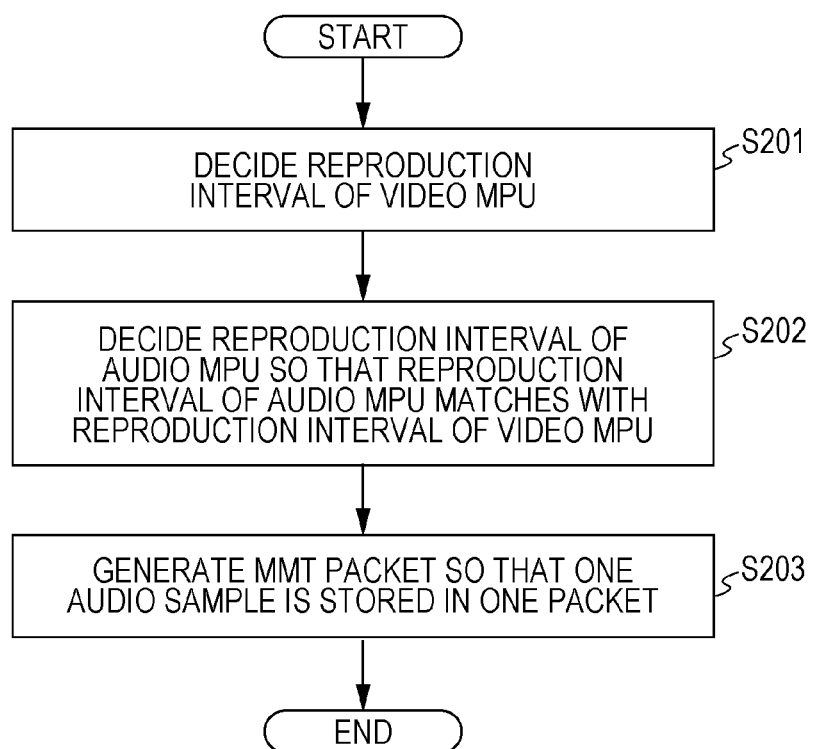
FIG. 12 is a flowchart illustrating a transmitting process according to the second exemplary embodiment.

FIG. 12 is a flowchart illustrating a transmitting process (a multiplexing process) according to this exemplary embodiment.

Video MPU generator 201 determines a reproduction interval of V_MPU (n) as an nth video MPU (S201). Video packetizing unit 204 packetizes the determined V_MPU (n) into a plurality of MMT packets. At this time, video packetizing unit 204 generates V_MPU (n) so that a head sample of V_MPU (n) becomes a random access point. That is to say, V_MPU (n) is formed by a random access unit of one or more videos.

Audio MPU generator 202 determines a reproduction interval of A_MPU (n) as an nth audio MPU so as to match with the reproduction interval of V_MPU (n) (S202).

Audio packetizing unit 203 generates the plurality of MMT packets so that each sample included in A_MPU (n) determined in step S202 is stored in each of the MMT packets (S203).

Transmitting apparatus 200 multiplexes the MMT packet of the audio generated by audio packetizing unit 203 and the MMT packet of the video generated by video packetizing unit 204, and transmits the packets.

In the above description, the reproduction intervals of V_MPU (n) and A_MPU (n) match with each other, but the reproduction intervals of V_MPU (n) and A_MPU (n) may be different from each other. In this exemplary embodiment, even when the receiving apparatus receives the audio MPU from halfway, the receiving apparatus can start decoding from the sample obtained just after the reception. For this reason, the reproduction intervals of V_MPU (n) and A_MPU (n) do not have to always match with each other.

When transmitting apparatus 200 according to this exemplary embodiment packetizes to multiplex the segment of the audio and transmits the packet, the transmitting apparatus 200 stores the header portion and the data storage portion of the segment in different packets, and further packetizes the data storage portion in each access unit. Further, transmitting apparatus 200 stores the index number representing the decoding order of the access unit in the segment in the header of the packet for storing the access unit so as to transmit the index number. As a result, the receiving apparatus can calculate PTS of the access unit. Therefore, the delay time until the receiving apparatus starts decoding can be shortened without limiting the packet multiplexing operation on the segment.

That is to say, transmitting apparatus 200 divides the audio data (the audio MPU) into a plurality of packets (the MMT packets) each of which includes one of a plurality of audio samples, and transmits the obtained packets. Further, each of the plurality of packets includes order information representing a packet number in each of the plurality of packets (the fragment SN).

Third Exemplary Embodiment

In this exemplary embodiment, a reproduction time of audio MPU is set so as to be shorter than a reproduction time of video MPU without making reproduction intervals of the video MPU and the audio MPU match with each other. As a result, since a transmission frequency of the audio MPU rises, random accessibility can be enhanced. When the random access is assumed in unit of MPU, in a case of video, RAU in coded data is a minimum unit of MPU. On the other hand, in a case of audio, since decoding can be started from any sample (an access unit), a number of samples forming MPU can be freely set.

For example, the reproduction time of RAU of the video is generally about 0.5 second to 1 second because of a balance between encoding efficiency and the random accessibility. Further, the reproduction time of the video MPU also accords with the reproduction time of RAU.

On the other hand, in the case of the audio, the reproduction time of MPU can be set to about 0.1 sec. For example, when the reproduction time of the audio MPU is set to 0.1 second, the reproduction of the audio can be started within 0.1 second at the latest after start of the reproduction of the video. When the reproduction time of the audio MPU is set so as to be short, the delay time until the reproduction of the audio can be started after the reproduction of the video can be shortened.

Figure 13:
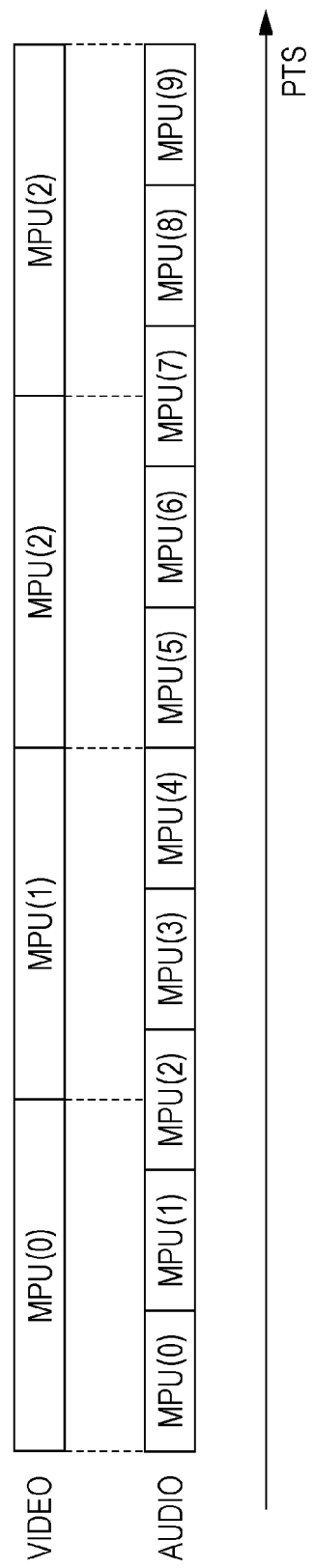
FIG. 13 is a diagram illustrating a configuration example of a transmission data according to a third exemplary embodiment.

FIG. 13 is a diagram illustrating one example of the video MPU and the audio MPU according to this exemplary embodiment. As shown in FIG. 13, the reproduction times of a plurality of audio MPUs are set so as to be shorter than the reproduction times of a plurality of video MPUs.

Figure 14:
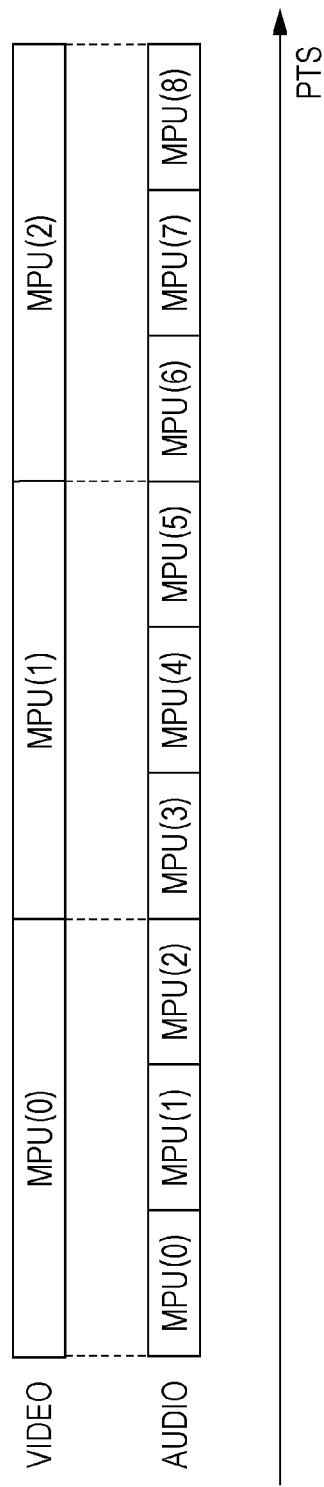
FIG. 14 is a diagram illustrating a configuration example of the transmission data according to the third exemplary embodiment.

Further, the reproduction intervals of the plurality of audio MPUs may be set so that head PTS of the video MPU is related to a head PTS of any of the audio MPUs. FIG. 14 is a diagram illustrating examples of the video MPU and the audio MPU in this case.

For example, when the reproduction interval of the audio MPU is set as shown in FIG. 13, the audio MPU having the same head PTS as head PTS of video MPU (1) is not present. In the example shown in FIG. 13, it is not ensured that the head PTS of the video MPU is related to a head PTS of any of the audio MPUs.

On the other hand, as shown in FIG. 14, when the reproduction interval of the audio MPU is set, the audio MPUs having the same head PTSs as the head PTSs of the respective video MPUs are certainly present. That is to say, it is ensured that the head PTS of the video MPU is related to head PTS of any of the audio MPUs.

Further, when the reproduction time of RAU of the video is constant, a transmitting apparatus obtains the reproduction time of MPU of the video prior to start of an MPU generating process so as to be capable of determining the reproduction time of the audio MPU. On the other hand, switching of a frame rate of a video material or a change in an encoding condition occurs and the reproduction time of RAU of the video becomes variable, the transmitting apparatus obtains the reproduction times of the video MPUs and simultaneously determines the reproduction times of the audio MPUs. A configuration and an operation of the transmitting apparatus according to this exemplary embodiment are described below.

Figure 15:
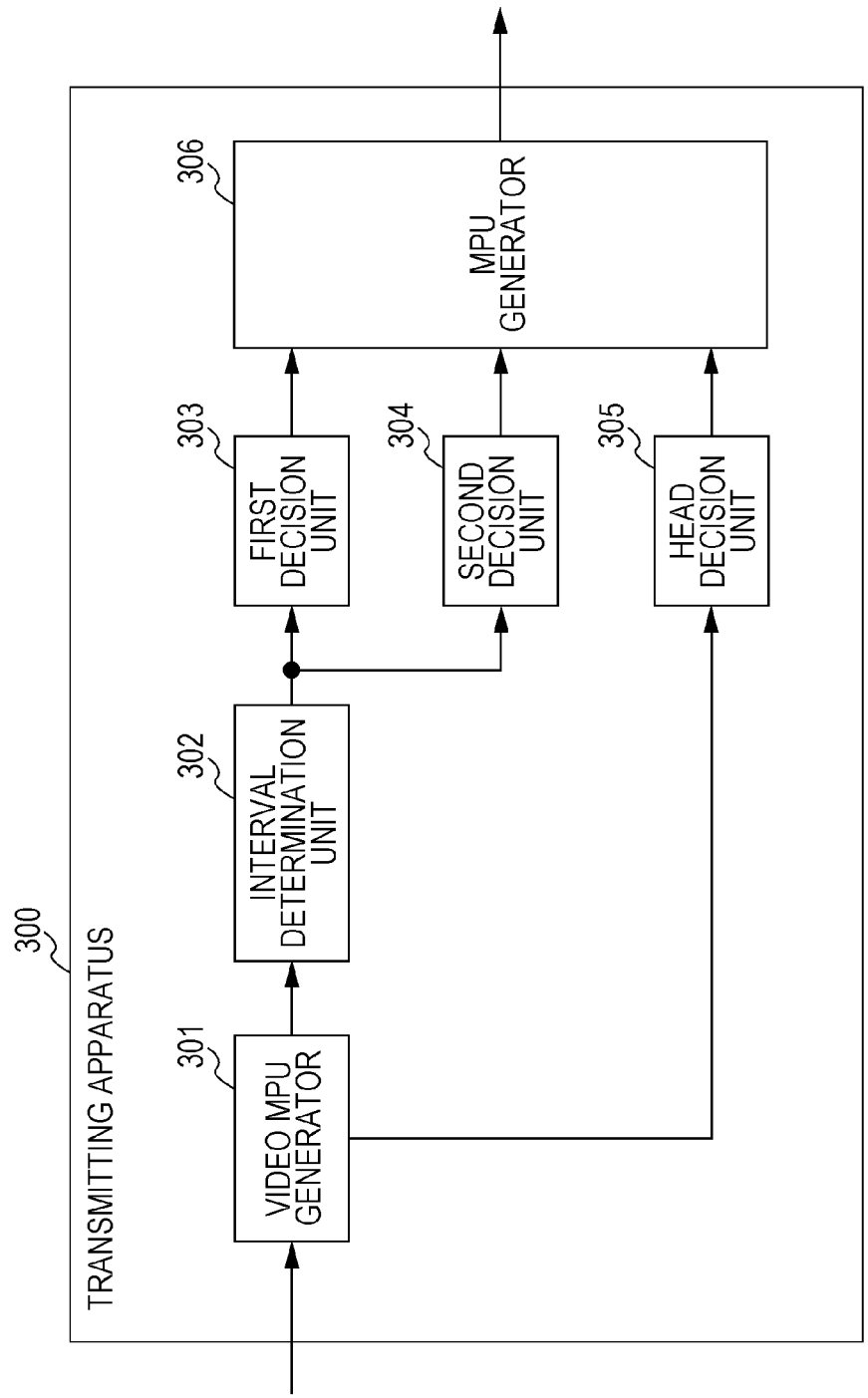
FIG. 15 is a block diagram illustrating a transmitting apparatus according to the third exemplary embodiment.

FIG. 15 is a block diagram illustrating transmitting apparatus 300 according to this exemplary embodiment. Transmitting apparatus 300 shown in FIG. 15 includes video MPU generator 301, interval determination unit 302, first decision unit 303, second decision unit 304, head decision unit 305, and MPU generator 306.

Figure 16:
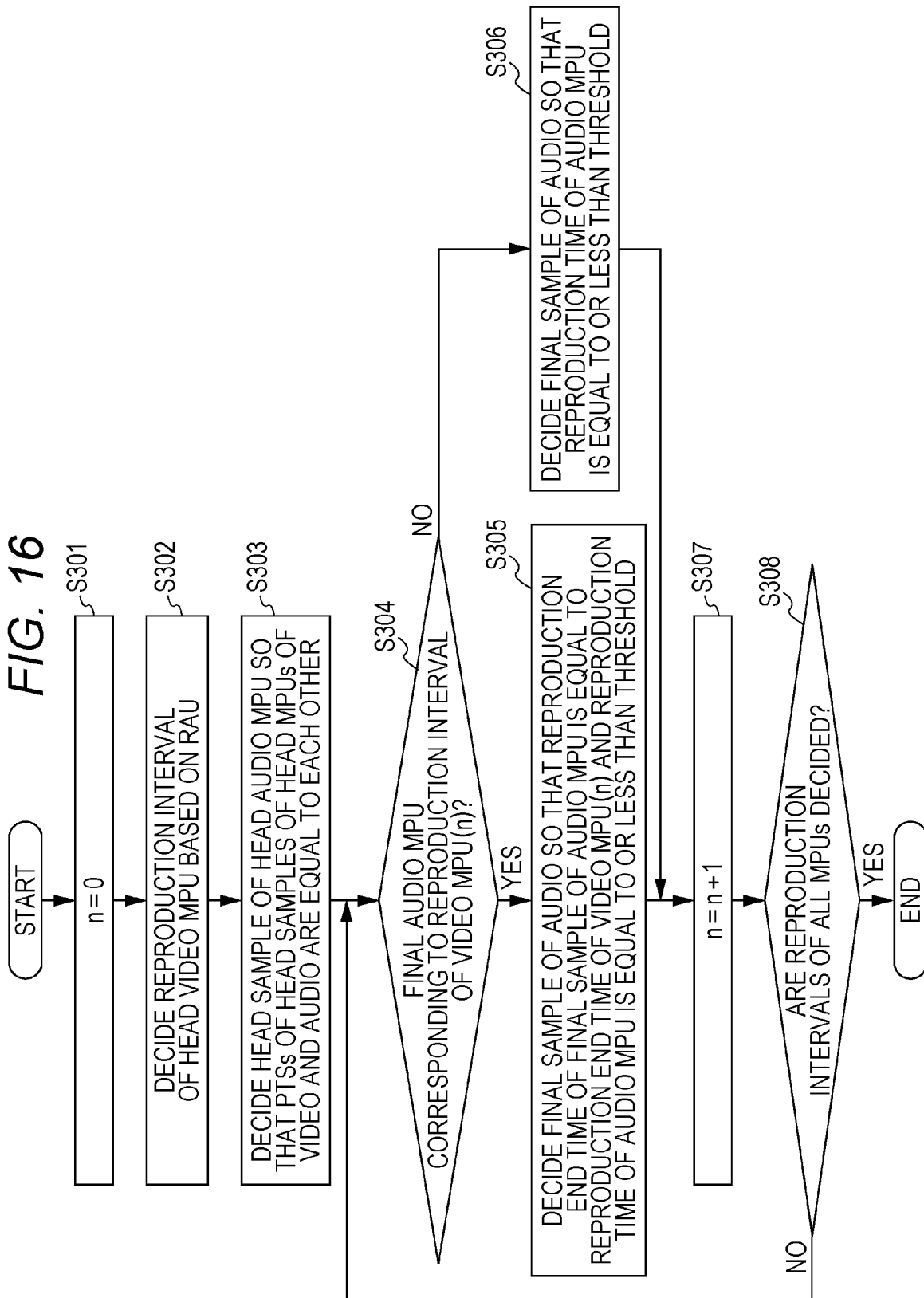
FIG. 16 is a flowchart illustrating a transmitting process according to the third exemplary embodiment.

FIG. 16 is a flowchart illustrating a transmitting process (a multiplexing process) according to this exemplary embodiment.

Transmitting apparatus 300 sets n to 0 as initial setting so as to select first MPU (S301).

Video MPU generator 301 determines a reproduction interval of a head video MPU (V_MPU (0)) based on video RAU (S302). The video MPU is formed by one or more RAUs.

Head decision unit 305, then, determines a head sample of A_MPU (0) so that PTSs of the head samples of V_MPU (0) and a head audio MPU (A_MPU (0)) are equal to each other (S303).

Interval determination unit 302 determines whether MPU (A_MPU) of audio to be processed is final MPU in a reproduction interval of V_MPU (n) (S304).

When A_MPU is the final MPU (Yes in S304), first decision unit 303 determines a final sample of A_MPU so that a reproduction end time of the final sample of A_MPU is equal to a reproduction end time of V_MPU (n) and a reproduction time of A_MPU is equal to or less than a threshold (S305).

On the other hand, when A_MPU is not the final MPU (No in S304), second decision unit 304 determines the final sample of A_MPU so that the reproduction time of A_MPU is equal to or less than the threshold (S306).

The threshold to be used in step S305 and S306 is set based on an allowable range of the delay time until the reproduction of the audio can be started after the start of reproducing the video at the random access point. As the reproduction time of MPU becomes shorter, a percentage of an MPU header in transmission data increases. Particularly, a bit rate of the audio is lower than that of the video. Further, a fixed portion that does not depend on the number of samples to be stored in MPU is large at the MPU header. Therefore, a reduction in overhead of the MPU header is important. Therefore, the reproduction time of MPU is determined based on, for example, both the delay time and the overhead of the MPU header.

Further, the number of the samples of the audio that can be stored in one MPU depends on the reproduction time of one sample. The reproduction time of one sample depends on a sampling frequency or the like.

After step S305 or S306, MPU generator 306 generates the audio MPU (n) based on the head sample of the audio MPU determined in step S303, and the final sample of the audio MPU determined in step S305 or S306.

Transmitting apparatus 300, then, increases n by 1 so as to select next MPU (S307), and repeats the processes of steps S304 to S307 until the reproduction intervals of all MPUs are determined (S308).

As the head sample in MPUs after the head MPU, samples just after the final sample in last MPU are set.

Further, transmitting apparatus 300 may classify MPUs according to switching of the sampling frequency and a channel constitution (monaural, stereo, or 5.1 channel). Thus, an encoding condition of the audio is constant in one MPU. As a result, since a receiving apparatus may cope only with the switching of the encoding condition in unit of MPU at the reproduction time, seamless reproduction can be easily realized at a switching time. For example, the receiving apparatus reads ahead the encoding condition (parameter) to be stored in a next MPU header or a head sample at the reproduction time so as to be capable of coping with the switching in advance.

Further, as shown in FIG. 13 and FIG. 14, it may be or may not be ensured that the head PTS of the video MPU is related to the head PTS of any of the audio MPUs.

As a result, transmitting apparatus 300 according to this exemplary embodiment generates a segment (MPU) of the video so that its head becomes a random access point, and generates a segment of the audio so that its reproduction time is equal to or less than a predetermined value. Transmitting apparatus 300 sets the reproduction time of the audio segment so that the reproduction time of the audio segment is shorter than the reproduction time of the video segment.

As a result, the overhead of the audio segment increases, but a PTS calculating process in the receiving apparatus can be made unnecessary. Further, a delay time until the receiving apparatus starts decoding is shortened.

That is to say, video data (video MPU) is one of a plurality of video data obtained by dividing a video signal. Audio data (the audio MPU) is one of a plurality of audio data obtained by dividing an audio signal. As shown in FIG. 13, a reproduction time of the audio data (the audio MPU) is shorter than a reproduction time of the video data (video MPU).

As shown in FIG. 14, the plurality of audio data (the audio MPU) may include a plurality of audio data at reproduction start times (PTS) approximately equal to reproduction start times (PTS) of the plurality of video data (video MPUs).

Fourth Exemplary Embodiment

This exemplary embodiment explains a receiving apparatus that receives data transmitted by transmitting apparatus 100 according to the first exemplary embodiment and reproduces the data.

Figure 17:
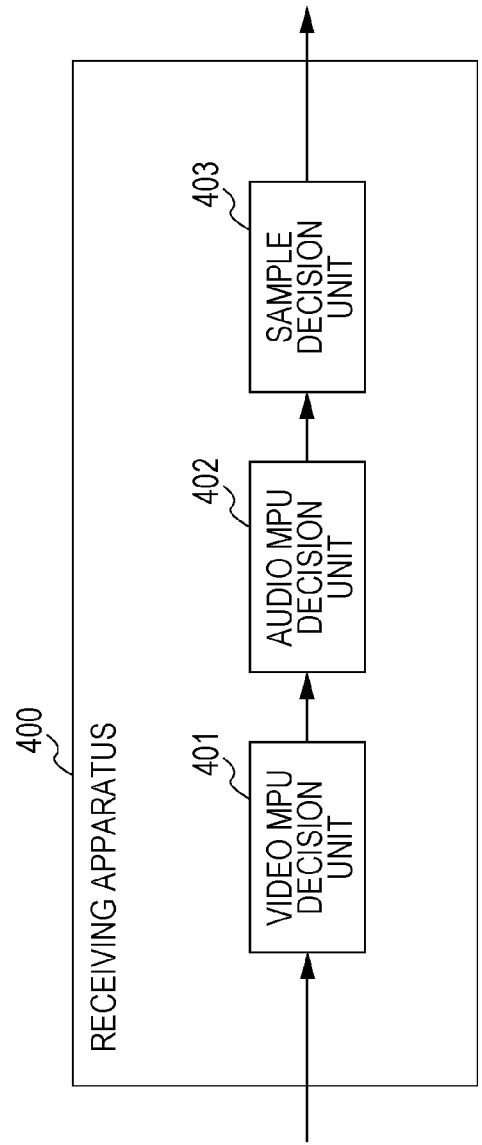
FIG. 17 is a block diagram illustrating a receiving apparatus according to a fourth exemplary embodiment.

FIG. 17 is a block diagram illustrating receiving apparatus 400 according to this exemplary embodiment. Receiving apparatus 400 shown in FIG. 17 includes video MPU decision unit 401, audio MPU decision unit 402, and sample decision unit 403.

Figure 18:
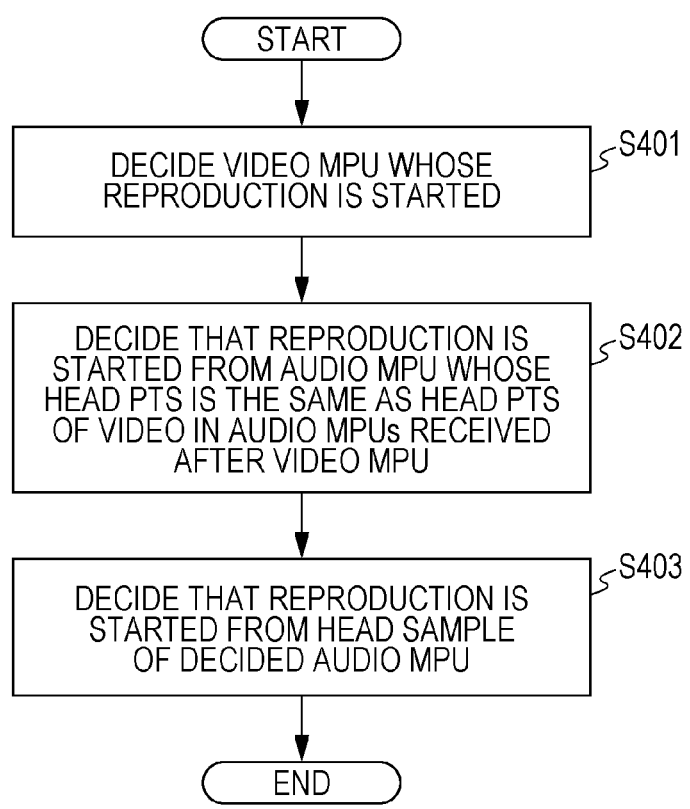
FIG. 18 is a flowchart illustrating a receiving process according to the fourth exemplary embodiment.

FIG. 18 is a flowchart illustrating a receiving process according to this exemplary embodiment. The flowchart shown in FIG. 18 illustrates an operation example for determining an audio sample whose decoding is started at a time of a random access.

Video MPU decision unit 401 determines video MPU (V_MPU) whose reproduction is started (S401). For example, a header of an MMT packet includes identification information representing either an MPU header or sample data is included in a payload. Further, receiving apparatus 400 can identify as to whether data to be stored in the payload is a video asset or an audio asset according to a packet ID (corresponding to PID of a TS packet). Therefore, video MPU decision unit 401 starts receiving a packet having a packet ID corresponding to the video asset in broadcasting or communication, and determines MPU whose MPU header is first obtained as V_MPU.

Audio MPU decision unit 402 searches MPUs whose MPU headers are received after V_MPU for audio MPU having the same head PTS as PTS (head PTS) of a head sample in V_MPU in display order, and determines the audio MPU obtained through the search as the audio MPU (A_MPU) whose reproduction is started (S402). The same PTSs are not limited to a case where PTSs completely match with each other, and as described in the first exemplary embodiment, the PTSs may be approximately the same as each other.

Further, since head PTSs of the audio and video MPUs are additionally presented through a MMT message or a descriptor of an MPEG-2 system at a time when the MMT packet is multiplexing by TS, audio MPU decision unit 402 can search for the audio MPUs having the head PTSs of V_MPU based on the additionally presented information. The information representing the head PTSs of MPUs is included in the MPU headers, and audio MPU decision unit 402 may search for the audio MPU having the head PTS of V_MPU by using this information.

Sample decision unit 403 then, determines that reproduction is started from a head sample of A_MPU (S403).

In step S403, since it is ensured that reproduction intervals of the video MPU and the audio MPU match with each other, sample decision unit 403 can determine that the reproduction is started from the head sample of A_MPU. On the other hand, when it is not ensured that the reproduction intervals of the video MPU and the audio MPU match with each other, receiving apparatus 400 may execute the following process.

Receiving apparatus 400 first obtains a head PTS (V_MPU.pts) of V_MPU.

Receiving apparatus 400 obtains the head PTS of the audio MPU obtained first after V_MPU and analyzes the MPU header so as to obtain the reproduction time of the audio MPU. Receiving apparatus 400 determines whether the audio MPU includes an audio sample having the same PTS as PTS of V_MPU.pts. PTSs do not necessarily match with each other, and receiving apparatus 400 may determine whether the audio MPU includes an audio sample having PTS just before or just after V_MPU.pts.

Further, when the reproduction time of the audio MPU is separately presented similarly to the head PTS of MPU, receiving apparatus 400 does not analyze the MPU header, and obtains the reproduction time of the audio MPU from the separately presented information.

When the determination is made that no audio sample having the same PTS as V_MPU.pts is present, receiving apparatus 400 obtains next audio MPU so as to execute the above determining process. The receiving apparatus 400 repeats the determining process successively on the subsequent audio MPUs until the determination is made that an audio sample having the same PTS as V_MPU.pts is present.

Receiving apparatus 400 may start reproduction of the video from the head sample of V_MPU, and may start reproduction of the audio from MPU just after A_MPU. When the decoding order of the video is different from the display order of the video, receiving apparatus 400 starts decoding from a head sample in the decoding order, and starts reproduction (display) from a head sample in the display order.

Further, prior to the start of reproducing V_MPU of the video, the reproduction of the audio may be started from A_MPU, and the reproduction of the video may be started at a time of V_MPU.pts.

Receiving apparatus 400 according to this exemplary embodiment determines that the decoding is started from a segment of the video whose header is first received after the start of the reception, and starts the decoding from a segment of the audio that matches with the head PTS of the video segment whose decoding is started. As a result, receiving apparatus 400 can shorten a delay time until the start of the decoding.

The case where a signal transmitted by transmitting apparatus 100 according to the first exemplary embodiment is received is described, but the similar method can be applied also to a case where a signal transmitted by transmitting apparatus 300 according to the third exemplary embodiment is received.

That is to say, receiving apparatus 400 determines that the decoding is started from a video segment whose header is first received after the start of the reception. Further, receiving apparatus 400 starts the decoding from an audio segment whose head PTS is the same as or after the PTS of the video segment whose decoding is started and that is first received. As a result, receiving apparatus 400 can shorten a delay time until the start of the decoding.

In such a manner, receiving apparatus 400 receives the video control information (the video MPU header), the video data (the video MPU), audio control information (the audio MPU header), and the audio data (the audio MPU) transmitted by transmitting apparatus 100 or 300 according to the first or third exemplary embodiment, and can reproduce the video data and the audio data.

Fifth Exemplary Embodiment

This exemplary embodiment describes a receiving apparatus that receives data transmitted by transmitting apparatus 200 according to the second exemplary embodiment and reproduces the data.

Figure 19:
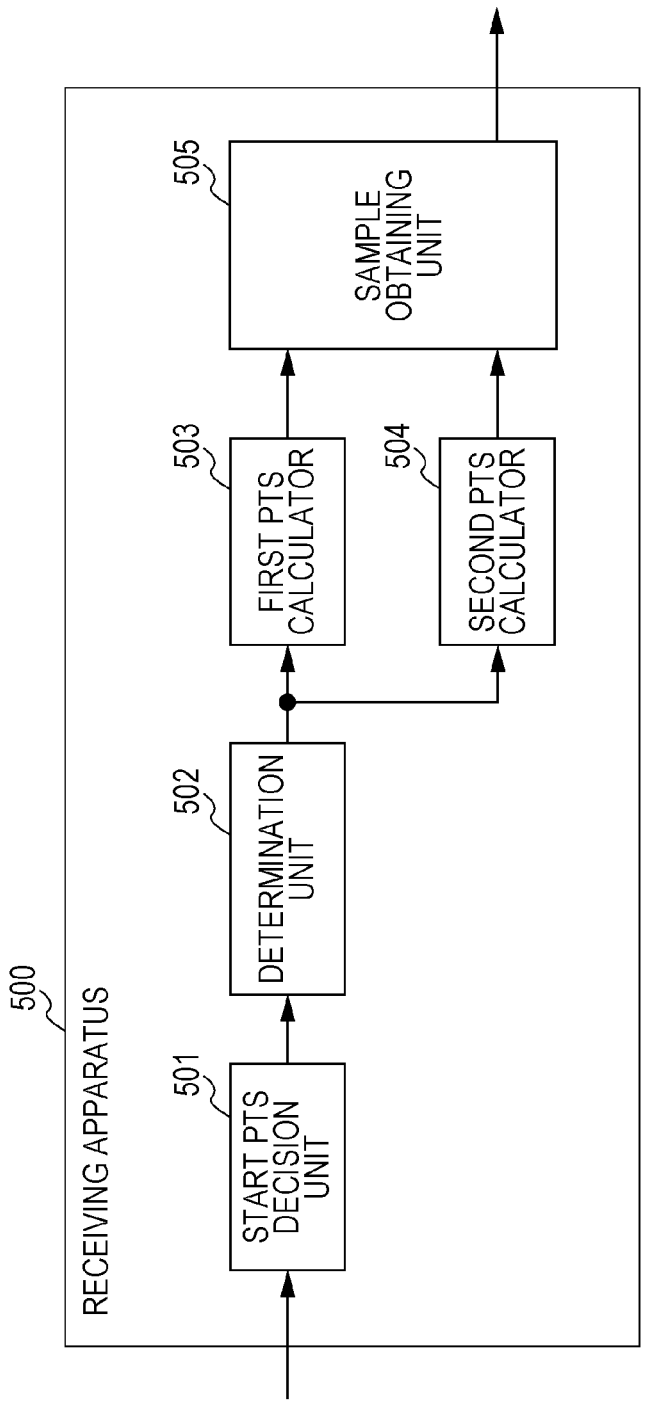
FIG. 19 is a block diagram illustrating a receiving apparatus according to a fifth exemplary embodiment.

FIG. 19 is a block diagram illustrating receiving apparatus 500 according to this exemplary embodiment. Receiving apparatus 500 shown in FIG. 19 includes start PTS decision unit 501, determination unit 502, first PTS calculator 503, second PTS calculator 504, and sample obtaining unit 505.

FIG. 20 is a flowchart illustrating a receiving process according to this exemplary embodiment. The flowchart shown in FIG. 20 illustrates an operation example for obtaining an audio sample whose decoding is started and determining PTS.

Start PTS decision unit 501 determines PTS (tgt_pts) of the audio sample whose decoding is started (S501). Further, the audio sample whose PTS is tgt_pts is designated by tgt_spl. For example, tgt_pts represents the head PTS of the video MPU from which the reproduction is started. This is because a random access point of video is generally a reference at a start time of reception after tuning of broadcasting or at a time of obtaining contents via a communication network.

Determination unit 502 determines whether a MPU header of MPU (mpu_cur) to which tgt_spl belongs can be obtained (S502). For example, determination unit 502 determines MPU (mpu_cur) including a sample whose PTS is tgt_pts based on a head PTS of each MPU separately obtained from an MMT message or the like. Information representing a head PTS of MPU is included in the MPU header, and determination unit 502 may determine MPU (mpu_cur) including a sample whose PTS becomes tgt_pts based on the information. In another manner, determination unit 502 separately downloads information relating to an asset forming an MMT package, and may determine the MPU (mpu_cur) including the sample whose PTS becomes tgt_pts based on the information.

When the MPU header of MPU (mpu_cur) can be obtained (Yes in S502), first PTS calculator 503 analyzes the MPU header, and obtains an index number of tgt_spl in mpu_cur (S503). PTS of the sample included in MPU can be determined based on information representing DTS and PTS of the sample included in trun in moof. Since the PTS obtained by analyzing moof is a differential value of MPU with respect to the head PTS, first PTS calculator 503 adds the head PTS of MPU to the obtained PTS so as to calculate actual PTS. First PTS calculator 503 determines the sample whose calculated PTS is the same as that of tgt_pts as tgt_spl. When no sample whose PTS is identical to that of tgt_pts is present, first PTS calculator 503 determines a sample whose PST is just before or just after tgt_pts as tgt_spl.

First PTS calculator 503 obtains an index number (the fragment SN) representing what number the sample tgt_spl is in MPU in the decoding order. When MPU includes a plurality of movie fragments, the fragment SN is a serial number starting from a head sample of head movie fragment.

On the other hand, when the MPU header of MPU (mpu_cur) cannot be obtained (No in S502), second PTS calculator 504 calculates PTS of the sample from the reproduction time of one sample based on (Expression 1) above, and obtains the index number of tgt_spl in mpu_cur (S504). Further, when PTS of the sample is obtained by using a method other than the method using (Expression 1) above, second PTS calculator 504 may use that method. The calculating method of PTS is described in detail in the second exemplary embodiment.

After step S503 or S504, sample obtaining unit 505 obtains a packet in which the sequence number of MPU at the header of the MMT packet matches with the sequence number of mpu_cur, and fragment SN is equal to the index number obtained in step S503 or S504, and obtains an audio sample that is included in the packet and from which the reproduction is started (S505).

An MPU header of a corresponding audio sample cannot be obtained at a random access point of video in some cases. The MPU to which the audio sample belongs is set as MPU (n), receiving apparatus 500 obtains PTS of the sample included in MPU (n) using the method in step S504, and obtains PTSs of samples included in MPU (n+1) and thereafter using the method in step S503.

Receiving apparatus 500 does not execute the process in steps S502 and S503 and may always obtain PTS using the method in step S504.

Further, an example where the audio sample whose decoding is started is determined in step S501 based on the reproduction start time of the video is described here, but this exemplary embodiment can be applied also to a case where the reproduction is started from an audio sample that can be obtained first after the start of reception. FIG. 21 is a flowchart illustrating a receiving process in this case.

Receiving apparatus 500 determines an audio sample (tgt_spl) from which the decoding is started (S511). For example, receiving apparatus 500 determines an audio sample received first as tgt_spl.

Receiving apparatus 500 determines whether the MPU header of MPU (mpu_cur) to which tgt_spl belongs can be obtained (S512). This process is similar to step S502 described above.

When the MPU header of MPU (mpu_cur) can be obtained (Yes in S512), receiving apparatus 500 analyzes the MPU header so as to calculate PTS of tgt_spl (S513). Details of the PTS calculating method are similar to above step S503.

On the other hand, when the MPU header of MPU (mpu_cur) cannot be obtained (No in S512), receiving apparatus 500 calculates PTS of a sample from the reproduction time of one sample based on (Expression 1) above (S514). Details of the PTS calculating method are similar to step S504.

The above process enables receiving apparatus 500 to obtain PTS of an audio sample even when the MPU header of the audio cannot be obtained.

Receiving apparatus 500 obtains data for one access unit from a payload of one packet, and calculates a difference between PTS of an access unit to be a head in a segment in the decoding order and PTS of the obtained access unit based on an index number. Further, receiving apparatus 500 separately obtains the head PTS of the segment so as to determine PTS of the access unit. When receiving apparatus 500 calculates PTS of the access unit in such a manner, the delay time until the start of decoding can be reduced without limiting the packet multiplexing operation on the segment.

That is to say, receiving apparatus 500 receives video control information (a video MPU header), video data (video MPU), audio control information (an audio MPU header), and audio data (audio MPU) transmitted by the transmitting apparatus 200 according to the second exemplary embodiment. Further, receiving apparatus 500 obtains a head reproduction start time that is a reproduction start time (PTS) of an audio sample to be reproduced first in a plurality of audio samples included in the audio data (the audio MPU).

Further, receiving apparatus 500 obtains each reproduction time of each of the plurality of audio samples. For example, receiving apparatus 500 obtains the number of samples included in an audio frame and a sampling frequency, and calculates each reproduction time of each of the plurality of audio samples based on the obtained number of the samples and the sampling frequency.

Receiving apparatus 500 determines a reproduction start time (PTS) of an audio sample included in the packet to be processed, by using the head reproduction start time, the reproduction time, order information (fragment SN) included in a packet to be processed.

Alternative Exemplary Embodiment

The multiplexing system to be applied to this disclosure is not limited to MP4, MMT, or DASH, and the present disclosure can be applied also to other formats with which coded data such as audio and video can be segmented.

The transmitting apparatus may store an MMT packet in an IP packet so as to transmit the packet. In broadcasting, the transmitting apparatus may store the IP packet in a TS packet or a TLV (Time Length Value) packet defined by ARIB (Association of Radio Industries and Businesses) so as to transmit the packet.

Further, the receiving apparatus may multiplex a segment such as MPU into a packet different from the MMT packet. The present disclosure can be applied to any protocol that enables MPU data of the audio and the video to be packetized and multiplexed into one stream.

In the first to third exemplary embodiments, the transmitting apparatus may multiplex the packet of the audio and the video so that a system decoder model (a model such as STD (System Target Decoder) in the MPEG-2 system) at the time of the packet multiplexing is satisfied. Also in an MMT packet process, a system decoder model can be defined.

Further, the above description individually describes the different methods in the first to third exemplary embodiments, but two or more of these methods may be combined. For example, when the receiving apparatus cannot obtain the MPU header of the audio due to communication error or the like, a combination of the method according to the first exemplary embodiment with the method according to the second or third exemplary embodiment enables the delay time until the reproduction of the audio to be shortened because of use of the method according to second or third exemplary embodiment. Further, when the second and third exemplary embodiments are combined with each other, an executing frequency of the process for calculating PTS based on information other than an MPU header can be reduced.

The transmitting apparatus, the receiving apparatus, the transmitting method, and the receiving method according to this exemplary embodiment are described above, but the present disclosure is not limited to this exemplary embodiment.

Further, the respective processing units included in the transmitting apparatus and the receiving apparatus according to this exemplary embodiment are typically implemented as LSI that is an integrated circuit. These processing units may be formed as separate chips, or some or all of the processing units may be included in one chip.

Also, the circuit integration is not limited to LSI, and may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

In the exemplary embodiment described above, respective components may be implemented with dedicated hardware or by executing a software program suitable for the components. The respective components may be implemented as a result of a program execution unit such as a CPU (Central Processing Unit) or processor loading and executing a software program recorded on a recording medium, such as a hard disk or a semiconductor memory.

In other words, the transmitting apparatus and the receiving apparatus include a processing circuitry, and a storage that is electrically connected to the processing circuitry (accessible from the processing circuitry). The processing circuitry includes at least one of dedicated hardware and a program execution unit. Further, when the processing circuitry includes the program execution unit, the storage stores a software program to be executed by the program execution unit. The processing circuitry executes the transmitting method or the receiving method according to the above exemplary embodiments by using the storage.

Further, the present disclosure may be implemented by a software program or a non-transitory computer-readable recording medium storing the program thereon. Obviously, the program can be distributed via a transmission medium such as the Internet.

Also, numerical values used above are merely illustrative ones used to describe the present disclosure specifically, and thus the present disclosure is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

The executing order of the steps included in the transmitting method or the receiving method is merely an illustrative one used to describe the present disclosure specifically, and thus the steps may be executed in any order other than the above order. Further, some of the steps may be executed simultaneously (in parallel) with another step.

The transmitting apparatus, the receiving apparatus, the transmitting method, and the receiving method according to one or a plurality of aspects of the present disclosure are described based on the exemplary embodiments, but the present disclosure is not limited to the exemplary embodiments. The present exemplary embodiment to which various modifications conceivable by a person skilled in the art are made and aspects that are made by combining components of different exemplary embodiments may also be within the scope of the one or the plurality of aspects of the present disclosure as long as such aspects do not depart from the gist of the present disclosure.

The present disclosure can be applied to any apparatuses or devices that carry out media transport of video data and audio data.

What is claimed is:

1. A transmission method comprising:
   transmitting MPU (Media Processing Unit) including a video data; and
   transmitting first control information and second control information, the first control information indicating a presentation time of a first sample in MPU, the second control information indicating a frame rate, the frame rate indicating a reproduction time period of a sample, and the frame rate being used for calculating a presentation time of a sample in the MPU,
   wherein the second control information is transmitted as a MMT (MPEG Media Transport) message.

2. A transmission apparatus comprising:
   a processor; and
   a transmitter, wherein
   the processor, in operation, performs:
      transmitting MPU (Media Processing Unit) including a video data; and
      transmitting first control information and second control information, the first control information indicating a presentation time of a first sample in MPU, the second control information indicating a frame rate, the frame rate indicating a reproduction time period of a sample, and the frame rate being used for calculating a presentation time of a sample in the MPU,
   wherein the second control information is transmitted as a MMT (MPEG Media Transport) message.

* * * * *